United States Patent
Pezeshki et al.

(10) Patent No.: US 10,054,748 B2
(45) Date of Patent: Aug. 21, 2018

(54) MICROMECHANICALLY ALIGNED OPTICAL ASSEMBLY

(71) Applicant: Kaiam Corp., Newark, CA (US)

(72) Inventors: Bardia Pezeshki, Menlo Park, CA (US); John Heanue, Boston, MA (US)

(73) Assignee: Kaiam Corp., Newark, CA (US)

( * ) Notice: Subject to any disclaimer, the term of this patent is extended or adjusted under 35 U.S.C. 154(b) by 0 days.

(21) Appl. No.: 15/640,075

(22) Filed: Jun. 30, 2017

(65) Prior Publication Data

US 2018/0067271 A1  Mar. 8, 2018

Related U.S. Application Data

(63) Continuation of application No. 15/203,590, filed on Jul. 6, 2016, now Pat. No. 9,726,836, which is a
(Continued)

(51) Int. Cl.
*G02B 6/42* (2006.01)
*G02B 6/32* (2006.01)
*G02B 6/35* (2006.01)

(52) U.S. Cl.
CPC ............ *G02B 6/4226* (2013.01); *G02B 6/32* (2013.01); *G02B 6/4207* (2013.01); *G02B 6/4214* (2013.01); *G02B 6/4215* (2013.01); *G02B 6/4225* (2013.01); *G02B 6/4239* (2013.01); *G02B 6/4244* (2013.01); *G02B 6/4249* (2013.01); *G02B 6/4257* (2013.01); *G02B 6/3598* (2013.01); *G02B 6/4238* (2013.01);
(Continued)

(58) Field of Classification Search
CPC .. G02B 6/4226; G02B 6/4207; G02B 6/4215; G02B 6/4244; G02B 6/4249; G02B 6/4257; G02B 6/4239; G02B 6/4225; G02B 6/4214; G02B 6/32
See application file for complete search history.

(56) References Cited

U.S. PATENT DOCUMENTS

| | | |
|---|---|---|
| 4,303,302 A | 12/1981 | Ramsey et al. |
| 5,392,371 A | 2/1995 | Marlion et al. |

(Continued)

FOREIGN PATENT DOCUMENTS

KR   10-2003-0065908   8/2003

OTHER PUBLICATIONS

International Search Report on corresponding PCT application (PCT-US2010-022779) from International Searching Authority (KR) dated Jul. 29, 2010.
(Continued)

*Primary Examiner* — Ryan Lepisto
(74) *Attorney, Agent, or Firm* — Klein, O'Neill & Singh, LLP

(57) ABSTRACT

An optical assembly includes a combination of laser sources emitting radiation, focused by a combination of lenses into optical waveguides. The optical waveguide and the laser source are permanently attached to a common carrier, while at least one of the lenses is attached to a holder that is an integral part of the carrier, but is free to move initially. Micromechanical techniques are used to adjust the position of the lens and holder, and then fix the holder it into place permanently using integrated heaters with solder.

9 Claims, 23 Drawing Sheets

Related U.S. Application Data continuation of application No. 14/320,287, filed on Jun. 30, 2014, now Pat. No. 9,405,072, which is a continuation of application No. 13/691,546, filed on Nov. 30, 2012, now Pat. No. 8,768,120, which is a continuation of application No. 12/698,086, filed on Feb. 1, 2010, now Pat. No. 8,346,037.

(60) Provisional application No. 61/148,551, filed on Jan. 30, 2009.

(52) U.S. Cl.
CPC .... *Y10T 29/49778* (2015.01); *Y10T 29/49902* (2015.01)

(56) References Cited

U.S. PATENT DOCUMENTS

| | | | |
|---|---|---|---|
| 5,727,099 A | 3/1998 | Harman | |
| 5,870,517 A | 2/1999 | Wyland | |
| 5,923,798 A | 7/1999 | Aksyuk et al. | |
| 6,074,103 A | 6/2000 | Hargreaves et al. | |
| 6,445,858 B1 | 9/2002 | Musk | |
| 6,450,702 B1* | 9/2002 | Komoriya | H02N 1/008 385/90 |
| 8,346,037 B2* | 1/2013 | Pezeshki | G02B 6/32 385/14 |
| 8,768,120 B2* | 7/2014 | Pezeshki | G02B 6/32 385/14 |
| 2001/0016097 A1 | 8/2001 | Shekel et al. | |
| 2003/0063838 A1 | 4/2003 | Hagood et al. | |
| 2003/0169996 A1 | 9/2003 | Lee et al. | |
| 2004/0062510 A1 | 4/2004 | Romo | |
| 2007/0263963 A1 | 11/2007 | Hughes et al. | |

OTHER PUBLICATIONS

Written Opinion on corresponding PCT application (PCT-US2010-022779) from International Searching Authority (KR) dated Jul. 29, 2010.

L. Huang et al., "MEMS Packaging for Micro Mirror Switches," Electric Components & Technology Conference (ECTC), pp. 592-597, May 1998.

S. Lee et al., "MEMS Actuators and Micropositioners for Integrated Micro-Optics," SPIE Proceedings vol. 3289, pp. 152-162, Apr. 20, 1998.

Kash et al., "Communication Technologies for Exascale Systems," Photonics West 2009, San Jose CA, Jan. 2009.

Ollier, Eric "Optical MEMS Devices Based on Moving Waveguides" IEEE Journal of Selected Topics in Quantum Electronics vol. 8, Issue 1, pp. 155-162, Jan.-Feb. 2002.

Henneken et al., "Two-Dimensional Fiber Positioning and Clamping Device for Product-Internal Microassembly" Journal of Microelectromechanical Systems, vol. 17, No. 3, pp. 724-734, Jun. 2008.

Extended European Search Report on corresponding European Application No. 10736546.2 from the European Patent Office (EPO) dated Apr. 14, 2014.

U.S. Appl. No. 15/203,590, filed Jul. 6, 2016, Bardia Pezeshki John Heanue, US 2016-0313518 A1, Office Action dated Dec. 28, 2016 Notice of Allowance dated Mar. 31, 2017.

* cited by examiner

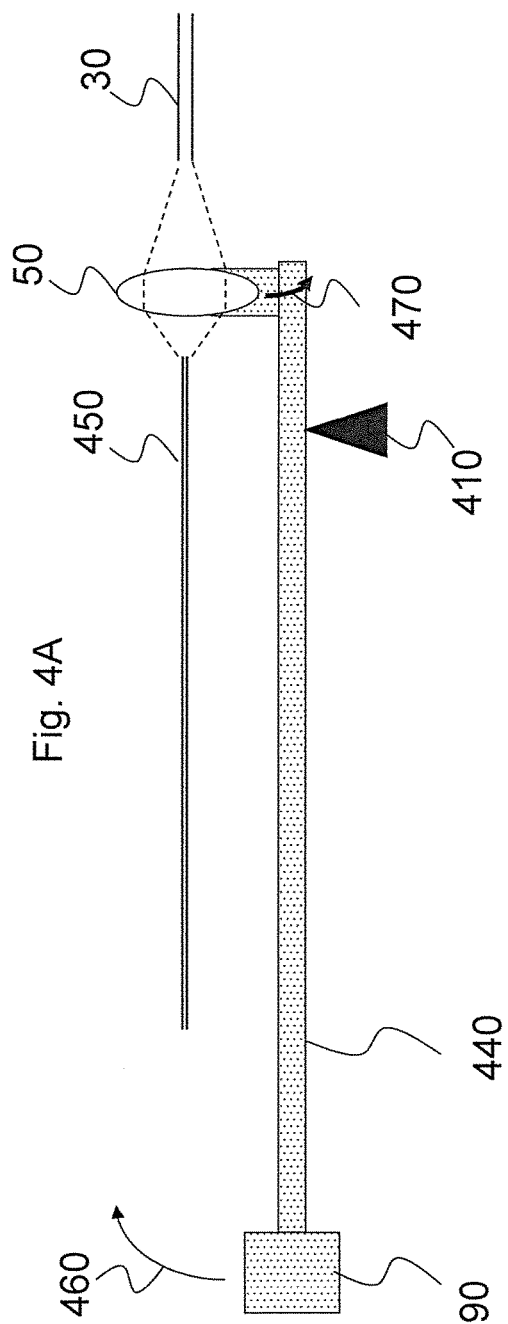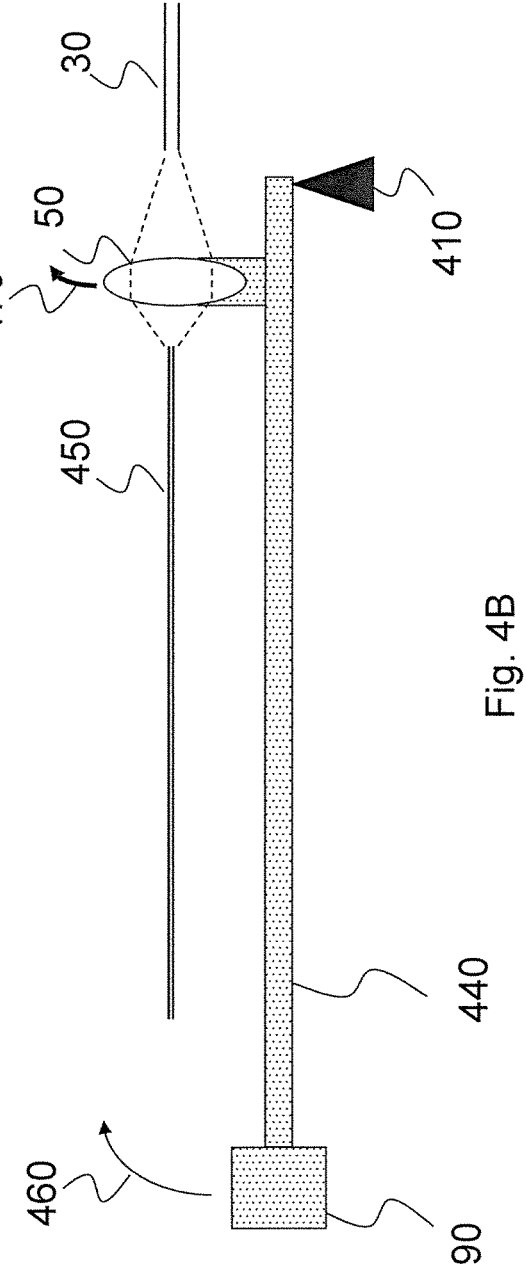

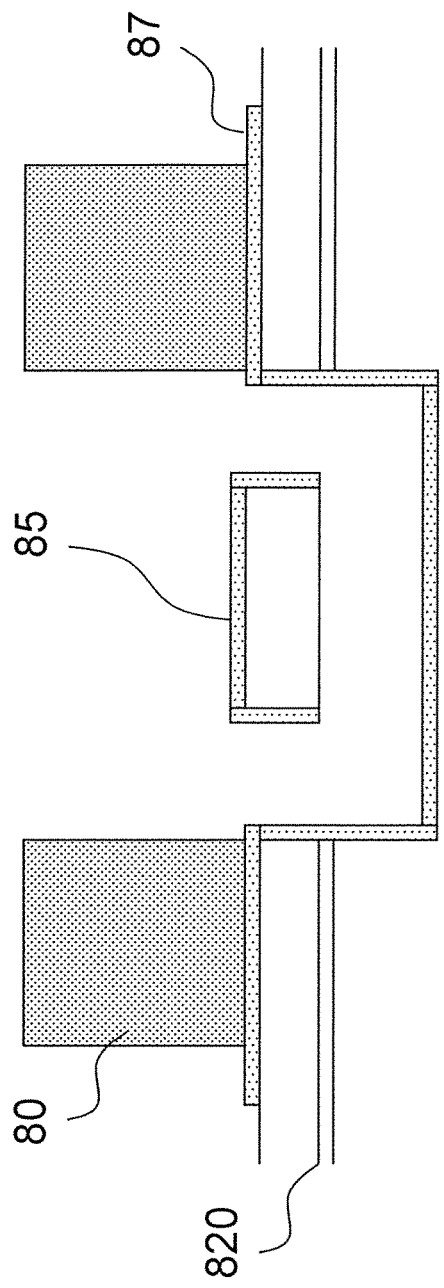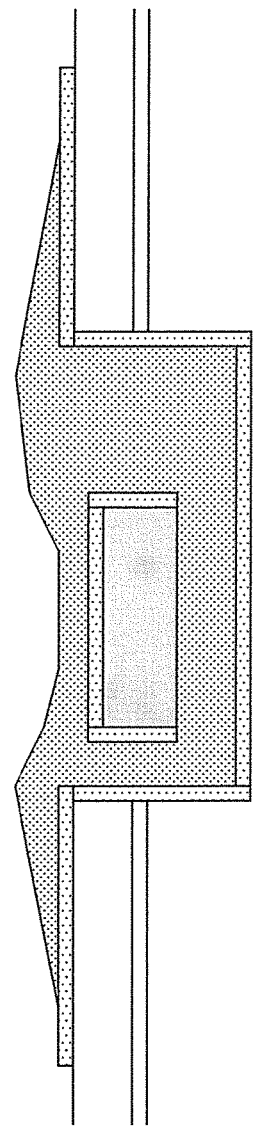
Fig. 10A
Fig. 10B

MICROMECHANICALLY ALIGNED OPTICAL ASSEMBLY

CROSS REFERENCE TO RELATED APPLICATIONS

This application is a continuation application of U.S. patent application Ser. No. 15/203,590, filed Jul. 6, 2016, which is a continuation application of U.S. patent application Ser. No. 14/320,287, filed Jun. 30, 2014, now U.S. Pat. No. 9,405,072, which is a continuation of U.S. patent application Ser. No. 13/691,546, filed Nov. 30, 2012, now U.S. Pat. No. 8,768,120, which is a continuation of U.S. patent application Ser. No. 12/698,086, filed on Feb. 1, 2010, now U.S. Pat. No. 8,346,037, which claims the benefit of the filing date of U.S. Provisional Application No. 61/148,551, filed Jan. 30, 2009, entitled "Micromechanically Aligned Optical Assembly" the disclosures of which are incorporated by reference.

BACKGROUND OF THE INVENTION

The invention relates generally to the fiber optic communications, and more particularly to optical packaging techniques used to align laser sources to optical fibers and other types of waveguides.

Optical fiber communications has generally replaced electrical links over long distances in the past few decades. In more recent past, optical links are being used at shorter distances to connect servers to switches and for datacenters. In the future it is expected as data rates increase and costs of optics decreases that optics will diffuse into computers and the connections within a machine or between processors will be optical. (see for example Kash et al. SPIE Photonics West conference 2009 and references cited therein, the disclosures of which are incorporated by reference herein)

A challenge of fiber optics has been that packaging and alignment processes are considerably more difficult than electrical wiring. The advantages are the greater bandwidth and reduced degradation of the signal with distance. At 10 Gb/s data rates, for the signal to travel more than 100-300 m in a fiber, single mode fiber is generally needed, with a typical mode size of about 8 microns. Laser sources typically have a mode size of only a few microns. Thus the alignment between the laser and the fiber through the intermediate optics generally has to be very high precision, and tolerances on the order of a tenth of a micron are typically required. One great advantage of single mode fiber is that multiple wavelengths can be coupled simultaneously to get a parallel link through a single fiber. Thus a 100 Gb/s signal can be sent through a single mode fiber for many kilometers by using ten channels of 10 Gb/s each, with every lane at a different wavelength.

As an alternative, when distances are on the order of 100 m or less, multimode fiber and multimode vertical cavity lasers are often used. In this case the core size in the fiber is much larger, at about 50 um, and tolerances can be substantially looser. However, the reach is limited as different modes of the fiber travel at different speeds and it is becomes more difficult to transmit multiple wavelength simultaneously.

As bandwidth requirements increase, there is increased parallelism in both single mode and multimode fiber links. In single mode systems, parallel channels can be obtained easily by adding wavelengths to the same fiber. In multimode systems, additional fibers generally are added to form a fiber ribbon. Parallel ribbon fibers are of course quite expensive and connectors with 24 fibers inside are complicated to make, even if they use multimode fiber with looser alignment tolerance.

There has been considerable work in the industry on different techniques of loosening the alignment tolerance in single mode systems. However, none is very effective, especially if multiple sources are coupled into the same fiber. In these cases there are multiple single mode alignments that occur in the same package.

The simplest way to loosen the tolerances slightly is to fabricate a laser with a bigger optical mode. The technique most commonly used is to have a tapered section at the output of the laser where the optical mode is expanded. This makes the laser mode roughly the same size as the optical fiber or waveguide mode and the alignment tolerance increases from about a quarter micron to about a micron. The disadvantage of this technique is that the fabrication of the laser or semiconductor source becomes more complex, raising the cost. There is also some sacrifice in the performance of laser. In addition, the effect of a laser with a slightly larger optical mode is not that dramatic. One micron alignment tolerance is better than a quarter of a micron, however, it is still not amenable to low cost packaging techniques.

Another technique is to etch the facet of the laser and add a passive silica waveguide. The laser is bonded upside down to a planar lightwave circuit (PLC) that has waveguides built in. The passive waveguide in the laser source and the waveguide in the PLC are matched in effective index, and with a slight taper, all the power can theoretically transfer from the laser source into the single mode waveguide underneath. This loosens the tolerance in the die bonding process to about 5 um, allowing the use of some standard packaging and diebonding equipment. The issue with this technique is that the laser chips become tremendously more complicated. One has to etch a facet and through epitaxial and lithographic processes, align a passive waveguide to the semiconductor waveguide. Such lasers are highly customized and there is an unavoidable optical loss between the laser waveguide and the passive waveguide formed next to it.

MEMS with active rather than passive alignment has also been used to align lasers and waveguides. Alignment may be performed with a MEMS mirror with alignment maintained by a control loop. However, the feedback loop has to be maintained during operation, requiring that the high voltage control electronics outside of the package stay active during operation.

There have been some proposals of MEMS active alignment techniques for switches and alignment of arrays. Some have moving waveguides (E. Ollier, "1\×8 Micromechanical Switches based on Moving Waveguides," in *Proc. 2000 IEEE/LEOS Int. Conf. Opt. MEMS* Kauai, H I, August 2000, pp. 39-40.), some have torsional mirrors (MEMS optical switches, Tze-Wei Yeow; Law, K. L. E.; Goldenberg, A. Communications Magazine, IEEE Volume 39, Issue 11, November 2001 Page(s):158-163) and some with lenses on an x-y stage (MEMS packaging for micro mirror switches, Long-Sun Huang; Shi-Sheng Lee; Motamedi, E.; Wu, M. C.; Kim, C.-J. Electronic Components & Technology Conference, 1998. 48th IEEE Volume, Issue, 25-28 May 1998 Page(s):592-597) (all of which are incorporated by reference herein). However, all of these approaches are complex and difficult to apply, for example, to PLCs.

BRIEF SUMMARY OF THE INVENTION

In some aspects the invention provides a structure containing multiple lasers of different wavelengths, a planar lightwave circuit that can combine the different wavelengths into a single waveguide, and set of lenses whose position can at least initially be adjusted using micromechanical means all mounted on a submount where the lasers and the planar lightwave circuit are soldered onto the submount lens holders are an integral part of the submount and are initially adjustable A structure as above where the lens holders are on a lever, thereby demagnifying the motions used to adjust their positions.

A structure as above where the submount contains a region of predeposited solder that can be reflowed with an integrated heater, and where the solder can lock down the position of the lens with electrical means The structure as above where actuators are formed on the submount, as an integral part of the submount, and where the actuators move the lenses to optimize the coupling without external mechanical motion In some aspects the invention provides a structure of at least one laser, one output waveguide, and a microlens, whereby the microlens can be moved by electromechanical means and locked down after optimizing the coupling.

In some aspects the invention provides a structure comprising of multiple lasers of different wavelengths, a planar waveguide circuit that can combine the different wavelengths into a single waveguide, a set of lenses for collimating and focusing the beam, and a set of micromirrors, whose deflection can adjust the position of the beam and the focusing of the beam into the waveguide.

The structure as above where the lasers are mounted on top of the planar lightwave circuit and emit the optical beam through the microlens onto to adjustable micromirror.

In one aspect of the invention, the invention provides a micromechanically aligned optical assembly, comprising: a first waveguide on a substrate; a second waveguide on the substrate; a lens for focusing light of the first waveguide into the second waveguide; and a lever holding the lens, the lever having at least one point fixed with respect to the substrate, the lever holding the lens at a position such that movement of the lever will result in demagnified movement of the lens in at least directions other than an optical axis of light of the first waveguide, the lever moveable so as to position the lens to focus light of the first waveguide into the second waveguide.

In one aspect of the invention, the invention provides the assembly of claim 1, further comprising: a plurality of further first waveguides on the substrate; a plurality of second waveguides on the substrate; a plurality of further lenses, each of the plurality of further lenses for focusing light of a corresponding one of the further first waveguides into a corresponding one of the further second waveguides; and a plurality of further levers, each of the further levers holding a corresponding one of the plurality of further lenses, each of the further levers having at least one point fixed with respect to the substrate, each of the further levers holding the corresponding further lens at a position such that movement of each of the further levers will result in demagnified movement of the corresponding lens in at least directions other than an optical axis of light of the corresponding one of the further first waveguides.

In one aspect of the invention, the invention provides an optical device, comprising: a first optical component configured to provide light; a second optical component configured to receive light; and a third optical component in an optical path between the first optical component and the second optical component, the third optical component mounted on an arm with a length along an axis substantially parallel to an axis defined by the optical path between the first optical component and the third optical component.

In one aspect of the invention, the invention provides a method of making an aligned optical assembly, comprising: manipulating a lever holding a lens to position the lens to focus light from a first waveguide into a second waveguide, the first waveguide and the second waveguide, being physically coupled to a substrate and the lever having a fulcrum fixed in position with respect to substrate, the lever demagnifying movement of the lens in other than an optical axis of the light.

In one aspect of the invention, the invention provides a method of making an aligned optical assembly, comprising: moving a lever holding a lens to position the lens to focus light from a first waveguide into a second waveguide, the first waveguide and the second waveguide being physically coupled to a substrate, with the lever having a point fixed with respect to the substrate and the lever having a length substantially parallel to an optical axis of the light from the first waveguide to the lens; and fixing position of the lever with the lens focusing light from the first waveguide into the second waveguide.

In one aspect of the invention, the invention provides a micromechanically aligned optical device, comprising: a first waveguide coupled to a substrate; a second waveguide coupled to the substrate; a lens for focusing light from the first waveguide into the second waveguide, the light having an optical axis substantially parallel to a planar base of the substrate; a holder for holding the lens, the holder physically coupled to the substrate; at least one electrically actuated actuator at least partially coupled to the holder, the actuator configured to cause movement of the holder in at least one direction absent application of means for effectively fixing position of the holder; and means for effectively fixing position of holder.

In one aspect of the invention, the invention provides a method of aligning an optical assembly, comprising: providing light from a first waveguide physically coupled to a substrate; providing an electric signal to an actuator to move a lens to focus light from the first waveguide into a second waveguide, the lens on a holder physically coupled to the first substrate, the actuator fixedly physically coupled to the holder; determining that the lens is focusing light from the first waveguide into the second waveguide; and fixing position of the holder.

In one aspect of the invention, the invention provides an aligned optical device, comprising: an input waveguide physically coupled to a substrate; an output waveguide physically coupled to the substrate; a lens configured to focus light from the input waveguide into the output waveguide; an arm holding the lens, the arm having a longitudinal length substantially parallel to an axis defined by a linear path from the input waveguide to the output waveguide, the arm being fixed in position with respect to the substrate.

In one aspect of the invention, the invention provides an aligned optical device, comprising: an input waveguide physically coupled to a substrate; an output waveguide physically coupled to the substrate; a lens configured to focus light from the input waveguide into the output waveguide; an arm holding the lens, the arm having a longitudinal length substantially parallel to an axis defined by a linear path from the input waveguide to the output waveguide; and means for fixing position of the arm with respect to the substrate.

In one aspect of the invention, the invention provides an optical device, comprising: an input waveguide; an output waveguide; a convex mirror mounted in a holder, the mirror moveable, in the absence of application of means to effectively fix position of the mirror, to reflect light from the input waveguide into the output waveguide; an arm physically coupled to the mirror, the arm having a moveable free end distal from the mirror; and means for effectively permanently fixing position of the mirror.

In one aspect of the invention, the invention provides an optical device, comprising: a plurality of input waveguides physically coupled to a substrate; a plurality of output waveguides physically coupled to the substrate; a plurality of lenses configured to focus light from each of a corresponding one of the input waveguides into a corresponding one of the output waveguides, the plurality of lenses mounted in a holder; a plurality of arms physically coupled to the holder, the further arms moveable, in the absence of application of means to effectively permanently fix position of the arms with respect to the substrate, so as to cause focus of light from each of the corresponding ones of the input waveguides into the corresponding ones of the corresponding output waveguides; and means for effectively permanently fixing position of the arms with respect to the substrate.

These and other aspects of the invention are more fully comprehended upon review of this disclosure.

BRIEF DESCRIPTION OF THE DRAWINGS

FIG. 4A shows schematically demagnification of motion of, for example, a lens by a class I lever.

FIG. 4B shows schematically demagnification of motion of, for example, a lens by a class II lever.

FIGS. 10A and 10B show a cross-section of a device with predeposited solder and with the solder melted to lock the micro-lever arm into an aligned position. FIG. 10A shows the cross-section prior to alignment and soldering, while FIG. 10B shows the cross-section after the procedure is completed.

DETAILED DESCRIPTION

Aspects of the present invention uses adjustable elements that are integral to the submount to move the optics to optimize the coupling. Once the alignment is perfected or acceptable, the parts are permanently soldered into place using microheaters.

Figure 1:
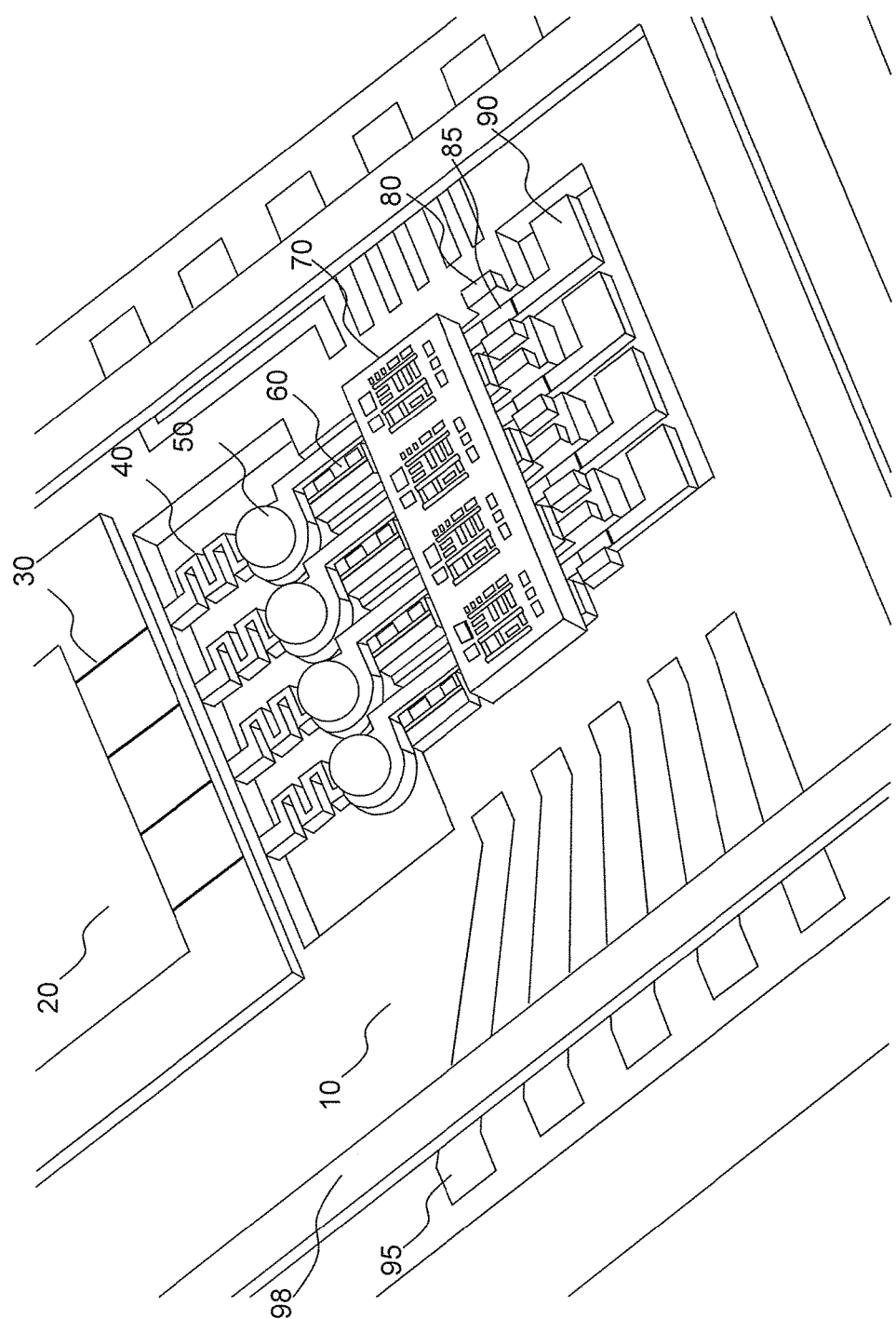
FIG. 1 illustrates 4 lasers coupled to a planar lightwave circuit (PLC) with 4 input waveguides using ball lenses on micro-adjustable stages.

FIG. 1 shows a laser to PLC coupling part in accordance with aspects of the invention. The entire assembly is mounted on a silicon breadboard or platform 10 that has been suitably prepared for hybrid integration. A PLC multiplexer 20 that combines many wavelengths into one waveguide is mounted on the silicon breadboard. Such a device could be based on etched gratings fabricated in silicon-on-insulator (SOI), or could be based on an Arrayed Waveguide Grating (AWG) fabricated with silica on silicon technology. In either case, there would be a plurality of four as illustrated, input waveguides 30 at one side of the chip and a single waveguide on the other side for output.

There are also 4 lasers 60 soldered on to the silicon breadboard 10. Each laser preferably has a different wavelength, where the wavelength is matched to that of the input waveguide of the PLC. The diverging light from each laser, typically with a full width at half maximum of 20 degrees in the horizontal and 30 degrees in the vertical is refocused by a ball lens 50 into the input waveguide of the PLC 30. Note that the ball lens 50 is preferably placed closed to the laser than to the PLC to magnify the image and match the farfield to the smaller natural divergence of the PLC input waveguides (typically 15 degrees by 15 degrees).

Each ball lens 50 fits into a holder etched out of silicon breadboard material. This holder is initially free to move in all three dimensions. There is a handle 90 at the end of this holder that can be manipulated in all three axes. The other side of the holder is fixed in the silicon breadboard 10 and cannot move. Between the ball lens and the fixed end of the holder there is a spring or flexure 40 that is made of thinner silicon in a zig-zag structure, allowing it to stretch slightly and bend up and down. As the handle 90 is manipulated up and down the lens on the holder also moves up and down. The entire spring/lens/holder assembly is a lever, where the lens is placed much closer to the pivot point. This causes a mechanical demagnification, such that a large motion of the handle causes a smaller motion of the lens.

Since the optical alignment of the system is generally important in the x and y directions (up/down and side-to-side), there is demagnification in both axes. However, the z or optical axis dimension, the alignment tolerance is much looser, and thus no demagnification is required. In this case the spring 40 stretches or compresses slightly.

There is a small metalized pad on the handle 85 and two thick depositions of solder on either side of the holder 80. There is electrical contact by way of metallization 87 (shown in FIG. 10A) between the two deposited solder regions, such that the application of electrical current between the solder pads causes localized heating and the solder to melt and lock the handle in position. Once the lasers, the PLC and lenses have been loaded on to the stage, the lasers are activated, and the holder 90 is adjusted to maximize the optical coupling to the PLC. At an acceptable optical coupling, and preferably optimum optical coupling, electrical current is applied to the solder pads, and the solder flows to a position to lock the holder in position. Optical coupling may be evaluated by determining optical output of the PLC, which may be performed for example measuring optical power using an optical power meter or other device. A substantial advantage of having the solder pad at the far end of the assembly is that any mechanical motion that might occur as the solder cools down is demagnified, and the system will see minimal reduction in output coupling. Generally the electrical current to melt the solder is removed after the solder has flowed to position to lock the holder in position, or sufficient heating has been applied to allow the solder to so flow. The solder serves, as one of skill understands, as an adhesive. In various embodiments other adhesives may be used to lock the holder in position, or laser welds or other means may be used.

Once the system is aligned, a high speed driver IC 70 may be mounted on top of the assembly, although in some embodiments the high speed driver IC is mounted prior to system alignment. This chip would be wirebonded to the lasers and to the silicon breadboard. By keeping the distance between the driver IC 70 and the lasers 60 short, good signal integrity can be maintained, and possibly the use of a 50 ohm matching resistor can be avoided.

There are also electrical interconnects 95 on the silicon breadboard that take both low speed and high speed signals from the periphery of the chip to the driver IC and lasers. The output of the PLC is not shown, but is coupled to a fiber, presumably through another lens and isolator. The entire assembly is then capped with a lid to seal the structure hermetically. A thick dielectric around the periphery of the chip 98 prevents the cap from shorting the electrical lines and is also used under the driver IC to allow room for motion of the lever arms.

Figure 2A:
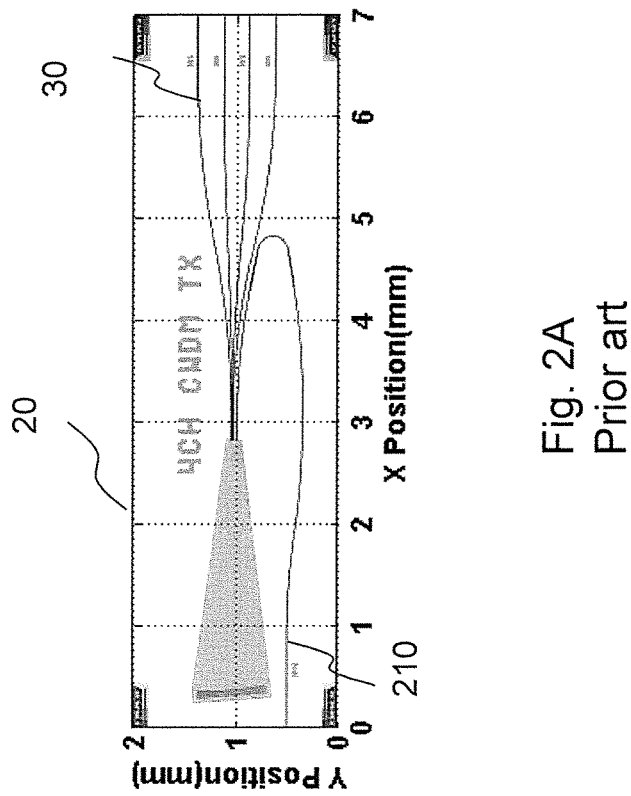
FIGS. 2A and 2B show a silicon-on-insulator PLC used for multiplexing wavelengths, each in a different waveguide, into a single waveguide, and a chart of transmittance versus wavelength for an example of the PLC.
Figure 2B:
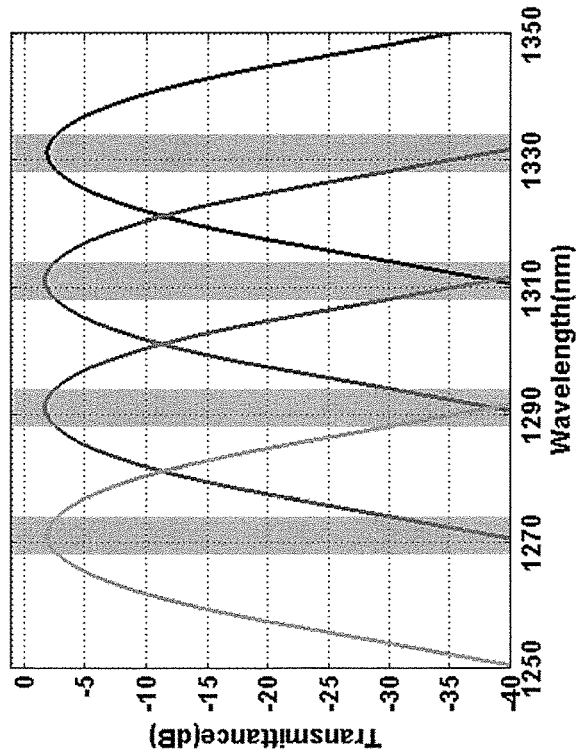

FIG. 2A shows such a PLC chip that is commercially available and suitable for such integration. The chip itself is shown in 200, and the spectral characteristics are shown in FIG. 2B. As previously described, there are 4 input waveguides 30 and a single output waveguide 210.

Figure 3:
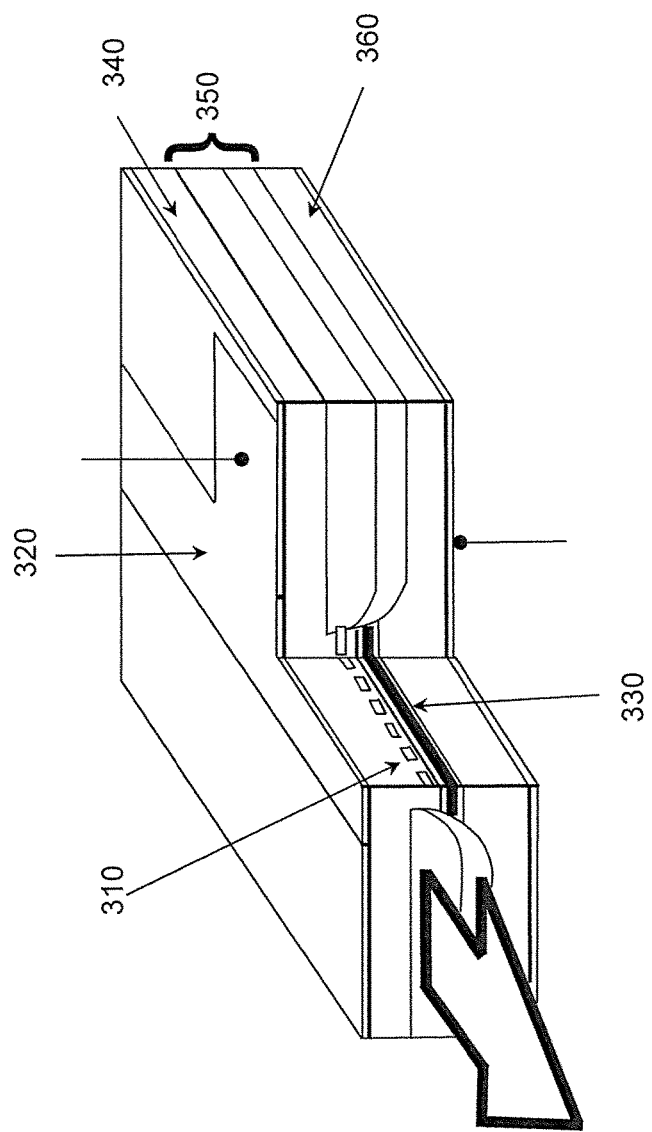
FIG. 3 is a schematic of a distributed feedback laser.

FIG. 3 shows a distributed feedback laser (DFB) that would be appropriate for this application. DFB lasers are generally available. The laser chip is made on an indium phosphide (InP) substrate 360. The light itself is produced in a higher index InGaAsP waveguide core 330. The current is supplied to a top contact 320 and is blocked everywhere by an intermediate layer 350 except to pass through the active stripe. The light is reflected back and forth by a built in diffraction grating 310, such that only a single wavelength is fed back and lases. These lasers have a clean single mode spectrum whose wavelength is precisely determined by the diffraction grating pitch. Four such lasers, preferably each with an appropriate wavelength would be used in the invention. As may be seen in FIG. 3, the DFB is an edge emitting laser.

In aspects of this invention the lens motion is demagnified by the lever on which the lens is placed. FIG. 4A shows schematically a class I lever. There is a fixed point 410 that acts as the fulcrum for the lever. A lens 50 is mounted on one side of the lever and the motion is imparted to the lever either by an outside actuator or with an integrated actuator on the other side of the lever, where there may be a handle 90. There is physical demagnification if the distance between the lens and the fulcrum is less than the distance from the handle to the fulcrum. The lens 50 takes the light from the source waveguide 450 and focuses it into an output waveguide 30. In one implementation, the source waveguide is provided by a DFB laser and the output waveguide is provided by a PLC. An advantage of the lens is that it can effectively transform the size of the mode, resulting in a better coupling efficiency. In FIGS. 4A and B, the input waveguide is shown smaller than the output waveguide, and thus the lens is closer to the input waveguide than the output waveguide to magnify the image to match the modes. When the holder side of the lever is actuated upwards, as shown in the figure by the arrow 460, the lens moves downwards, as shown in the figure by the arrow 470. An advantage of this configuration is that the motion of the lens is demagnified by the lever, thus the motion 470 is much smaller than the motion 460, and a more precise alignment can be obtained. In a class I lever, the motion of the lens is in the opposite direction of the motion of the handle FIG. 4B shows the same concept, but in a class II lever, where the fulcrum or the fixed point 410 is placed at the end of the lever opposite the handle, as is the case of the device of FIG. 1. In this case the motion 460 is also demagnified, but in the same direction.

Figure 4C:
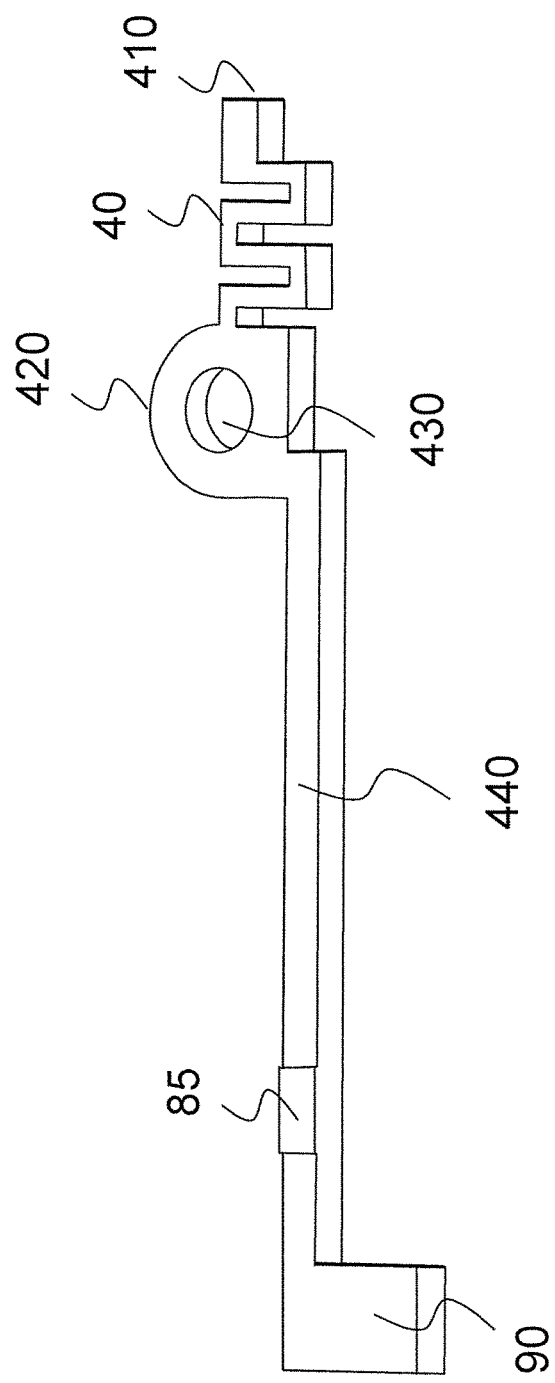
FIG. 4C shows a handle/lens holder/spring assembly.

FIG. 4C shows a detail of an embodiment of a spring/holder/handle assembly, useful for the invention. Conceptually, the embodiment of FIG. 4C works as a class II lever when a first end 410 of the assembly is substantially fixed in position, with a first end of the assembly being the anchor point or the fulcrum. This end is fixed and connected to the silicon breadboard. The spring or flexure 40 allows or increases the ability of the assembly to bend up and down and side-to-side and to stretch. The lens itself fits into a holder section 420 that has an etched ring 430. Preferably the assembly has a long lever arm 440 that is substantially larger than the distance from the anchor 410 to the lens holder 420. This allows mechanical motion of a lens in the holder section to be demagnified. Close to the other side of the lever is a metalized pad 85 that will adhere to the molten solder, allowing the lever to be locked into place. A handle 90 is at a second end opposite the first end, and may be used to position the lens or mate with an actuator that optimizes the position of the lens.

Figure 5:
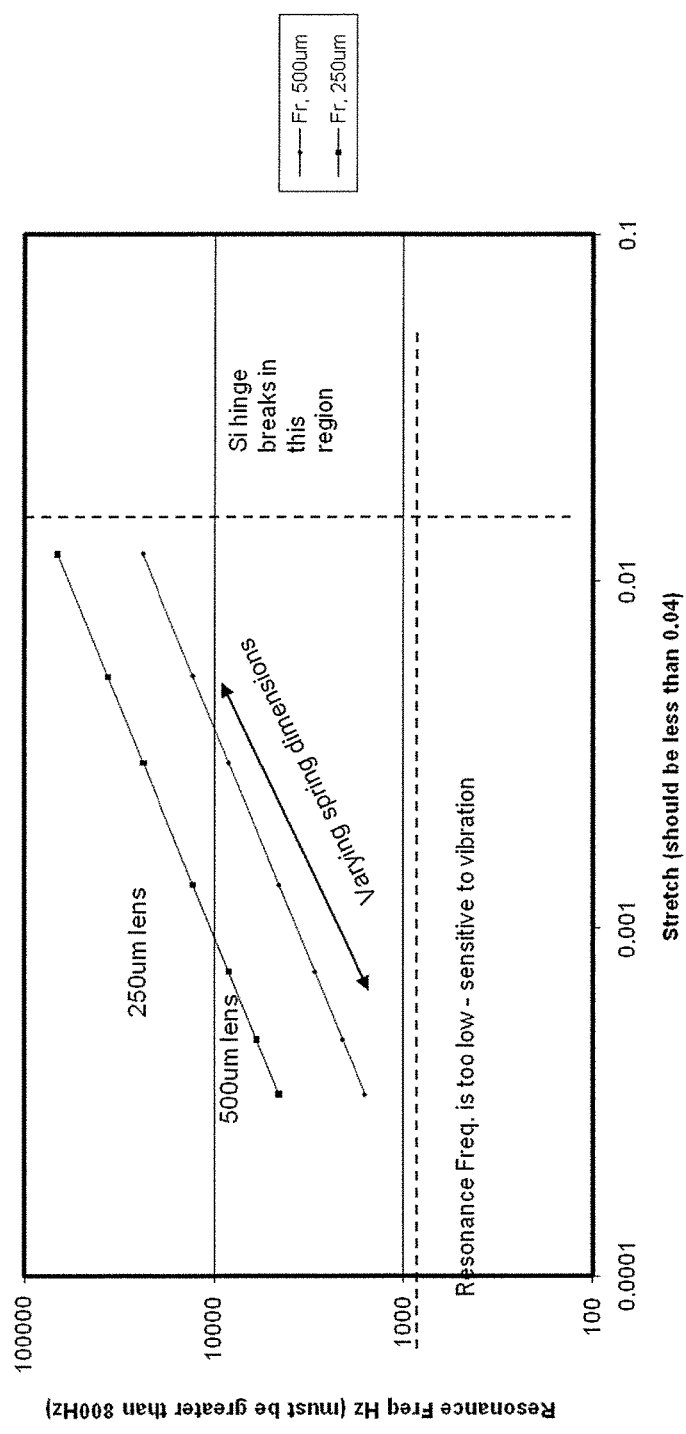
FIG. 5 is a plot showing resonance frequency and strain as a function of varying spring parameters for a 250 um and a 500 um diameter ball lens.

The design of the spring should preferably be soft enough such that sufficient motion is obtained in x, y, and z without putting undue strain on the spring. Similarly the spring should preferably be hard enough such that the assembly does not have a low resonance frequency and be sensitive to shock and vibration. The spring can be made softer by making the silicon thinner, narrower, or the spring section longer. Similarly, the spring can be made stiffer by varying these dimensions in the other direction. Nearly all the mass is in the ball lens and the resonance frequency of the assembly can be calculated by knowing the spring constant and the mass of the lens. Similarly the strain on the silicon can be calculated from the displacement of the lens from the equilibrium. The maximum displacement of the lens is determined by the die bonding accuracy of the lasers and the PLC. FIG. 5 shows the results of this calculation for a 250 um diameter and a 500 um diameter ball lens assuming a maximum displacement of the lens of 3 microns, achievable with semi-manual die bonders. On the y-axis, the resonance frequency of the assembly is plotted and on the x axis is plotted the maximum relative strain in the silicon. The design preferably should have a high resonance frequency to be insensitive to outside shock and vibration. Typically, for resonant frequencies above ~800 Hz, there are no issues with Telcordia standards. So preferably the design point is above this number on the y-axis. On the x-axis, if one divides the Young's modulus of silicon by the yield stress, one obtains that silicon can theoretically be stretched by 4% before catastrophic failure. Thus on the x-axis, preferably the spring should be below this value of relative strain. As FIG. 5 shows, there is considerable freedom in the design of the spring, with all the points clear of the design limits. As the lens becomes smaller, the design margin increases.

Figure 6:
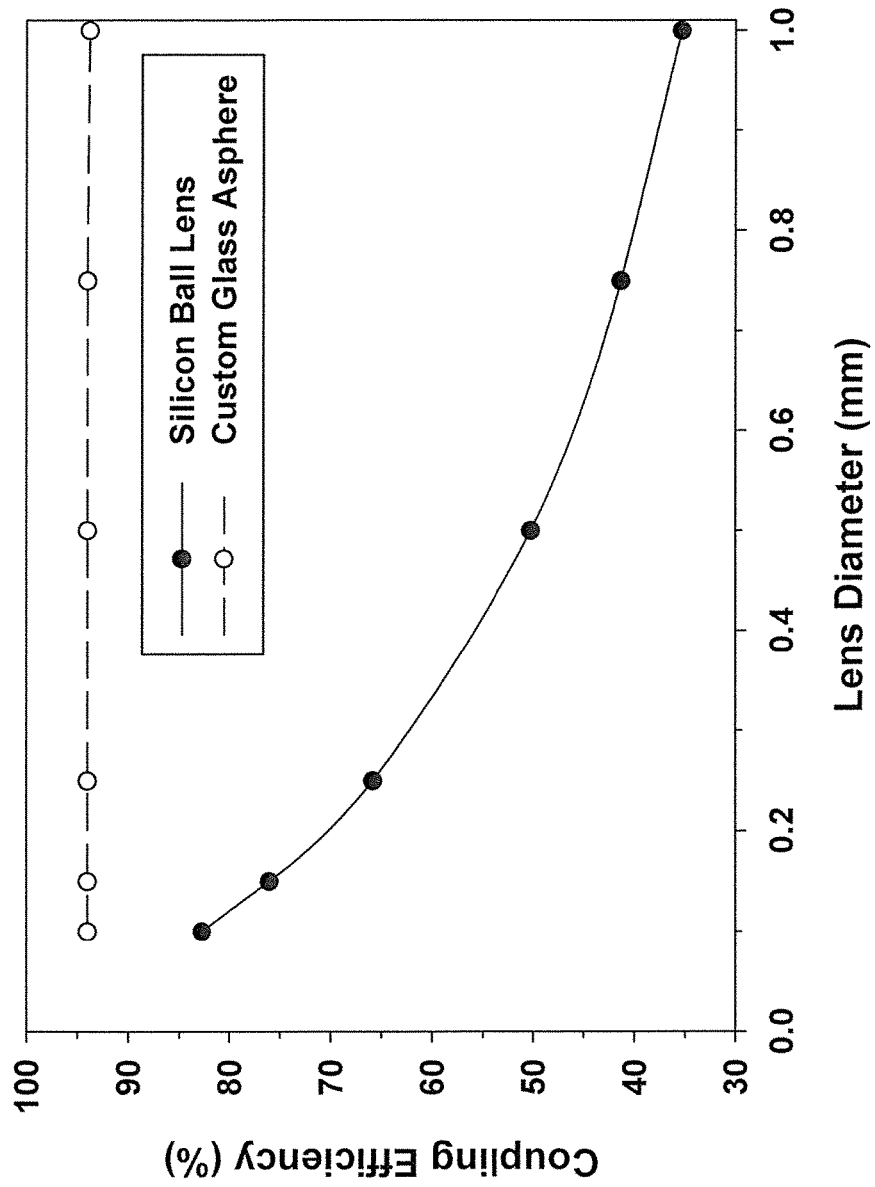
FIG. 6 shows coupling efficiency of a silicon ball lens compared to a custom aspheric at various lens diameters.
Figure 7:
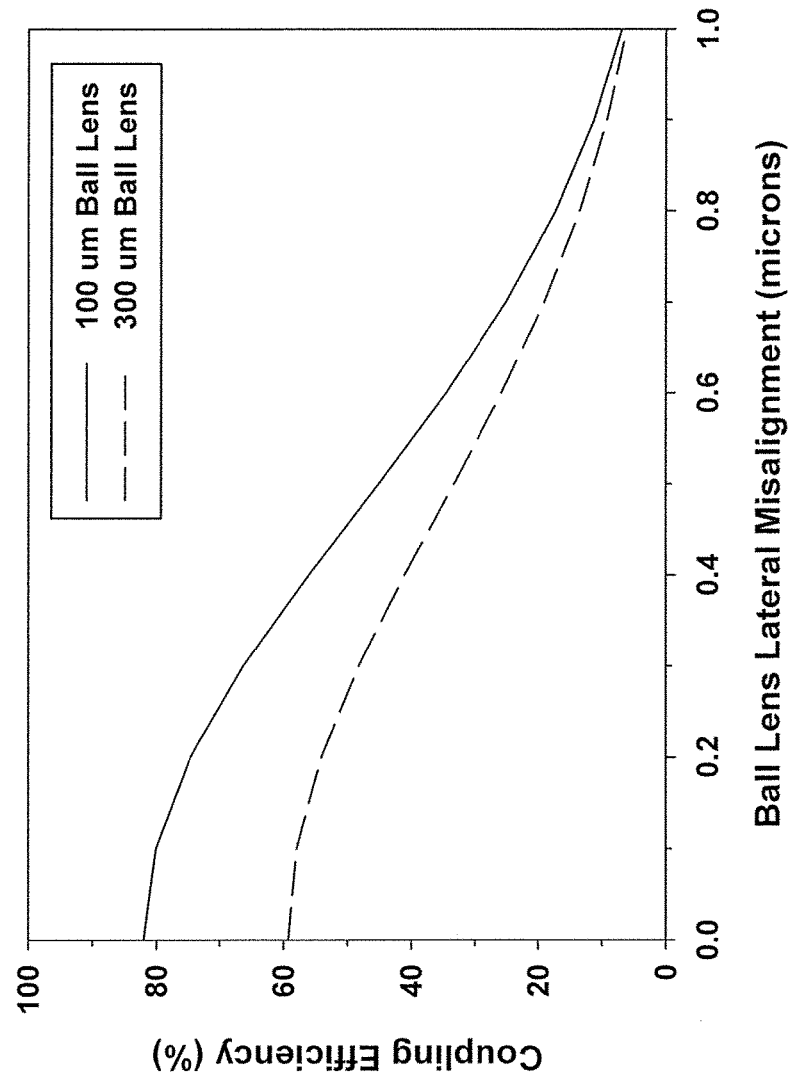
FIG. 7 shows an example variation in coupling efficiency as a function of lateral misalignment of a 100 um and 300 um ball lens.

The ball lens should also preferably be designed for optimal coupling. An optimal design matches the laser mode to the PLC waveguide mode. A ball lens is ideal for this application on the order of the low cost and easy assembly, however, it suffers from increased spherical aberration compared to a glass asphere. FIG. 6 shows that the penalty is relatively small if one uses small enough optics. Generally aberrations are reduced as the dimensions of the optics decrease. The x-axis in FIG. 6 is the diameter of the lens, while the calculated coupling efficiency is shown on the y-axis. With a custom glass asphere, one can design the surface of the lens for optimal coupling, limited only by the mismatch in the elipticity of the modes—in this case above 90%. However, a ball lens fabricated from silicon has high spherical aberrations, and at a 1 mm diameter has only a 35% coupling efficiency. But as the optics is reduced in size, the coupling efficiencies of the ball lens and the aspheric become similar. The alignment tolerance of small ball lens is slightly tighter than a large optic, but within appropriate limits. FIG. 7 shows the alignment tolerance calculation for a 100 micron silicon ball lens and a 300 micron lens. As may be seen in FIG. 7 the smaller optic has better coupling efficiency, but both have similar tolerances of about 0.15 microns for a 0.5 dB power drop.

Figure 8:
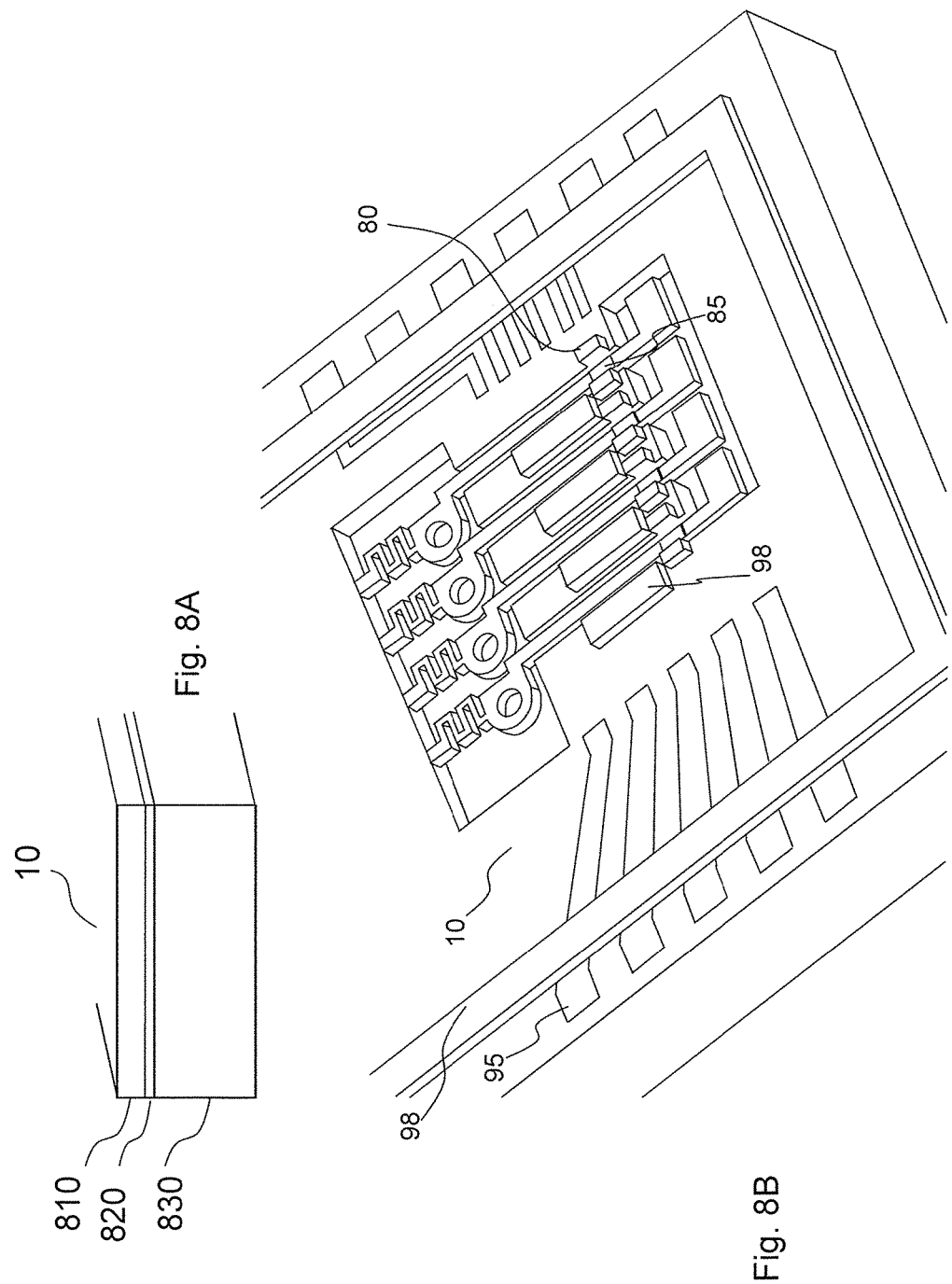
FIGS. 8A and 8B show a silicon optical breadboard. In 8A, the original silicon-on-insulator cross-section is shown, and in B, the fully processed breadboard.

FIGS. 8A and 8B relate to the processing steps using lithographic technologies for a device such as shown in FIG. 1. The starting material that ultimately becomes the optical breadboard, shown in A, is a raw silicon-on-insulator wafer, obtainable from numerous commercial sources. The substrate 830 is n-type silicon, while in this example there is a one micron thick layer of silicon dioxide 820 and a 15 micron thick top p+-type silicon layer 810. The spring and handle will be built from this top silicon layer.

The wafer is lightly oxidized and then metalized to form the high speed traces (95). A relatively thick (~20 um) layer of dielectric is then formed on the wafer to cover the high speed traces where the cap seals onto the chip and also form pedestals for the mounting of the driver IC (98). The top silicon wafer is then etched, stopping at the SiO2 layers and forming the cavity around the springs and the handles. The silicon underneath the oxide is then etched with a KOH solution to undercut and release the springs and handles. Note that KOH is selective and will not etch the top p+ doped layer. A final quick oxide etch cleans off any remaining oxide under the mechanical components. Finally another layer of metallization followed by deposition of solder is applied to form the solder structure and the metallization on the lever arm. Angled evaporation may be used to allow metallization into the groove under the lever arm.

Figure 9:
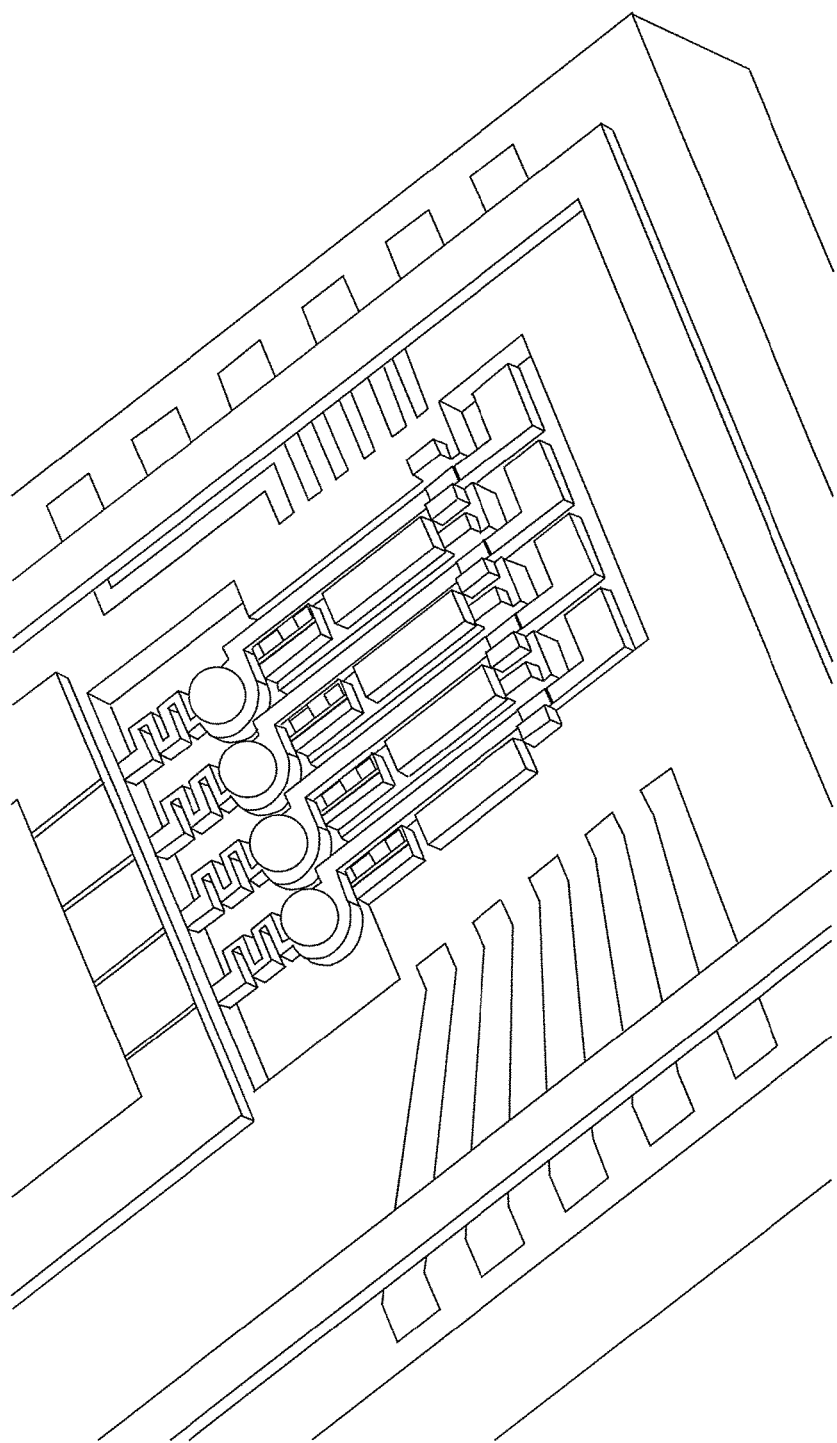
FIG. 9 shows the breadboard of FIG. 8 populated with lenses, PLC, and laser diodes.

Once the optical breadboard is completed, the four laser diodes are soldered into the assembly, with a mechanical tolerance of about <+/−5 um. The ball lenses are then fixed to the holders, using for example either solder or high temperature epoxy. Finally the PLC is attached with rough alignment of the input waveguides, with a resulting structure as shown in FIG. 9.

A cross-section through one arm around the metallization is shown in FIGS. 10A and 10B before the solder process (FIG. 10A) and after the alignment (FIG. 10B). The assembly is actively aligned, beginning with the solder in the configuration of FIG. 10A.

Each laser is activated and the handle on the end of the lever arm is adjusted to optimize the coupling into the PLC. The feedback for the alignment can be obtained by monitoring the optical power exiting the PLC using an external fiber coupled power meter or an integrating sphere, or alternatively by an on-board photodetector that is mounted on the PLC itself and monitors the light in the waveguide. Once acceptable, or preferably optimal, alignment has been achieved, an electrical current is passed between the two metalized pads on each side of the moveable arm. This causes the solder to melt and flow into the cavity and around the arm, sealing or lacking the arm in place, as shown in FIG. 10B.

There are various other ways of fixing the position of the lever after alignment has been achieved. For example, rather than electrically melting the solder to lock the arm, one may use a laser to heat the solder, which may be referred to in the art as laser soldering. One may also use epoxies that can be cured either thermally, with UV light, or a combination. Rather than having solder on both sides of the lever, one may have just one solder ball to one side, and align the part by pushing the lever into the melted solder ball. Finally, one can fix the arm in position by laser welding the silicon directly.

After the arm is locked down, the driver IC is attached, the package is wirebonded, the output is coupled to a fiber using a standard methodology, and a cap put on to seal the package.

Figure 11:
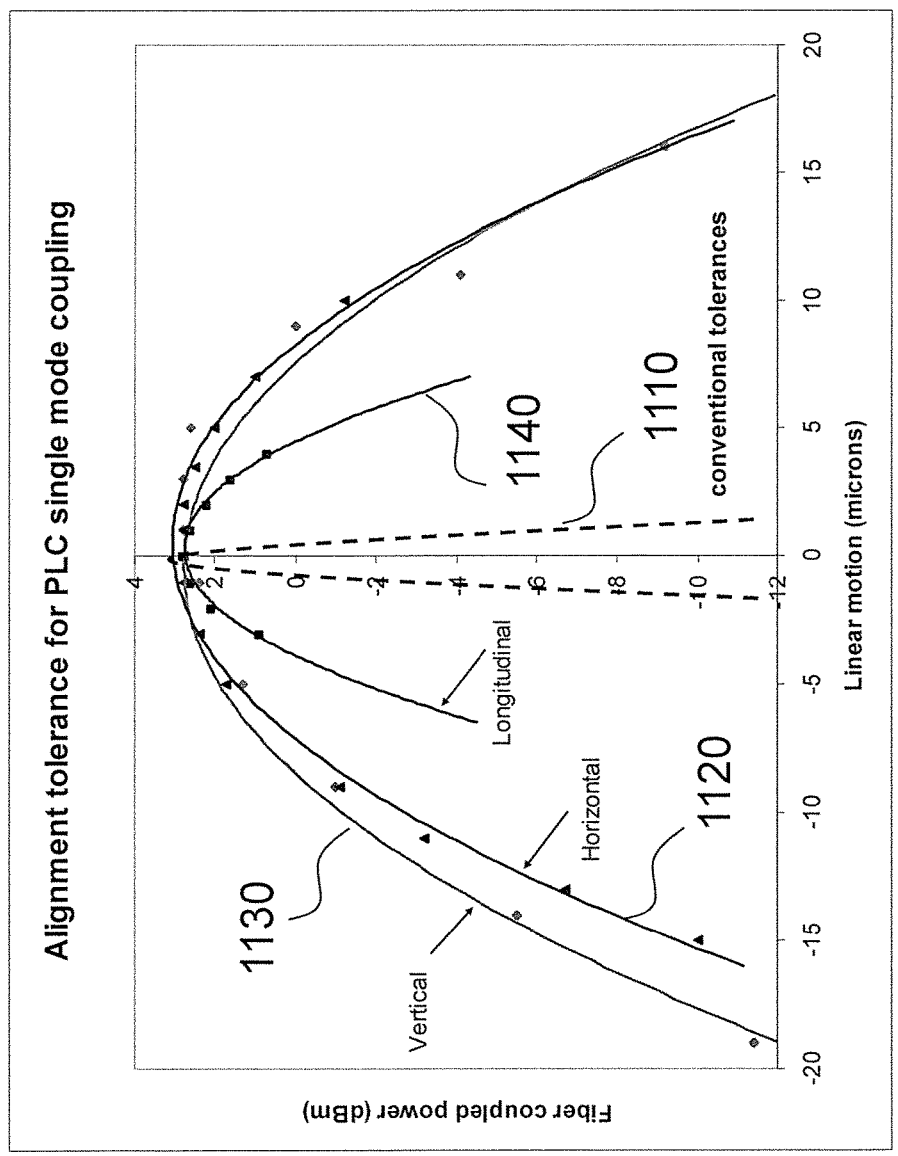
FIG. 11 shows dependence of coupled power into a waveguide as a function of the linear displacement of the handle.
Figure 12:
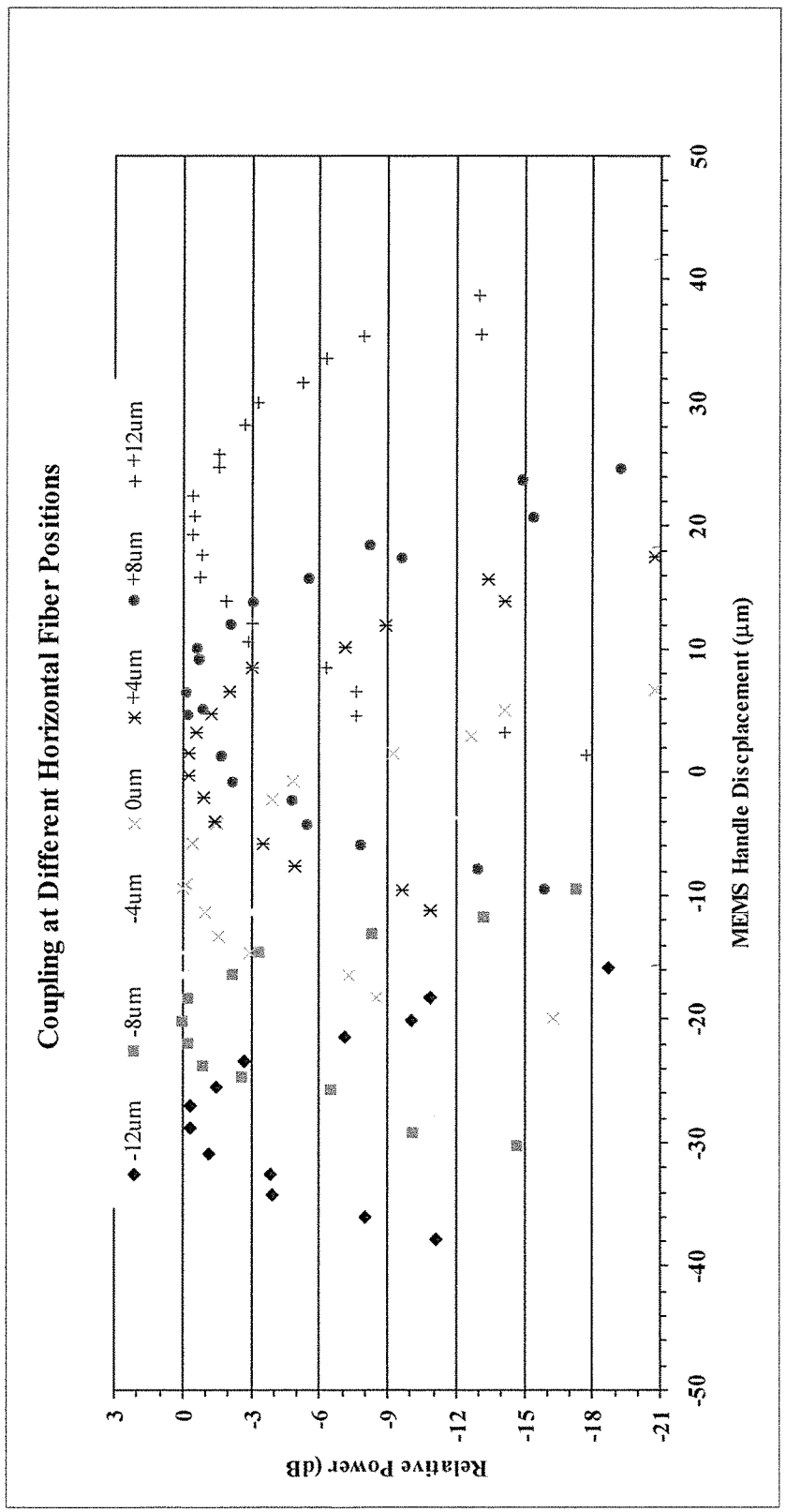
FIG. 12 shows the power coupled to a waveguide when this output waveguide is shifted to different positions, which illustrates that by actuating the MEMS, the power can be completely recovered.

The use of the lever discussed earlier is extremely useful in loosening the alignment tolerances. An apparatus in accordance with aspects of the invention was built and the alignment tolerances measured with respect to moving the end of the lever. FIG. 11 shows the experimental results. The y-axis of the figure is the optical power coupled to the PLC, while the x-axis shows the movement of the lever. The various curves correspond the motion in the different axes. The dashed curve 1110 shows the power coupled into the waveguide if the lens itself is moved in x or y directions (with the z-axis being the optimal axis). As shown in FIG. 11, the coupled power drops off rapidly with the linear motion, and therefore very precise alignment is preferred outside the optical axis. This curve represents the conventional tolerances that one requires in fiber optic alignment. However, with the lever, the alignment tolerances loosen greatly. The curves 1120 and 1130 show the coupled power if the lever is used to perform the alignment in x (horizontal) and y (vertical). As shown in FIG. 11 the tolerances are loosened greatly compared to the original curve 1110. In this particular structure, there is no demagnification in z and curve 1140 shows the sensitivity of the coupled power to longitudinal displacements of the lens. Since this is relatively loose due to the long depth of focus, there is no need to expand it, and this curve applies to the conventional alignment technique and the one presented here. In some embodiments, the parts such as the laser and the PLC are soldered onto the breadboard using standard tools with loose positioning tolerance. Once the parts are put down the levers are moved to align the optical beams, and they are locked down at the optimal position. The loose tolerance shown in FIG. 11 implies that the levers can be moved coarsely, and when they are locked down, a small shift has negligible effect on the coupled power. However, the fundamental tolerances are even larger than shown in FIG. 11, because one can obtain fairly large displacement of the lens using this technology. The ability to move the lens implies that parts can initially be placed with very large errors. FIG. 12 shows measured data where the output waveguide was moved horizontally from the optimum position, analogous to errors in positioning the PLC, and the MEMS was scanned to re-optimize the alignment. The y axis of the figure is relative coupled power into the output waveguide. One can see that the output waveguide position can be moved +/−12 microns, and the MEMS reoptimized to compensate for the error.

Figure 13:
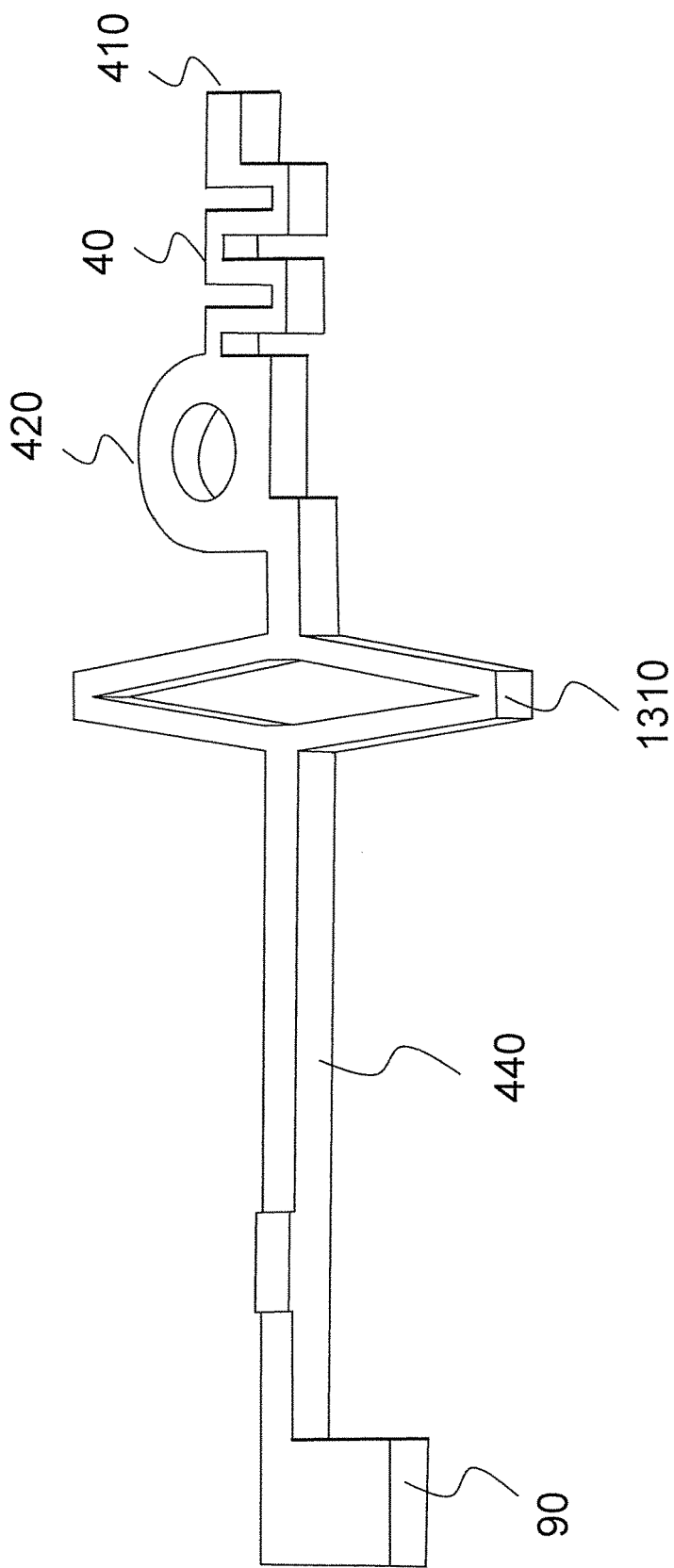
FIG. 13 shows a lever structure with two springs. This loosens tolerances longitudinally as well as laterally and vertically. If the handle is compressed or stretched, the lens moves in proportion to the ratio of the stiffness of the two springs.

As previously mentioned, the lever described earlier can demagnify tolerances in the horizontal (x) and vertical (y) directions, but does not do the same in the longitudinal (z) direction. This is not a significant problem since the longitudinal tolerance is usually relatively large. However, a simple modification can also allow for a looser tolerance in z. This is shown schematically in FIG. 13. The part is very similar to what was described previously except for the addition of an extra flexing element or spring 1310 on the other side of the lens holder 420. The spring 1310 should preferably be resistant towards bending, but fairly weak in the longitudinal direction. As the handle 90 is pushed in spring 1310 and spring 40 are both compressed. If the two springs are of equal stiffness, then the lens holder 420 would move towards the anchor point 410 half the distance that the handle 90 moves, and therefore there would be a demagnification of a factor of 2. If spring 310 is 9 times weaker than spring 40, then the demagnification factor would be ten times.

In some embodiments actuators for moving the lever are built directly on the breadboard, including the lever, itself. There are a variety of actuators that are well known in the art, including comb, thermal, and electro-static. These can be formed around the lens holder to move the lever in all three axes, and then used to lock the lever into place in some embodiments or hold the lever in place while adhesive, such as solder or epoxy, is used to lock the lever into place. The optical breadboard can then be completely assembled and go through an automated calibration process, where the on-chip actuators are used to align and then fix the various adjustable components. This would simplify the manufacture of the part.

Figure 14:
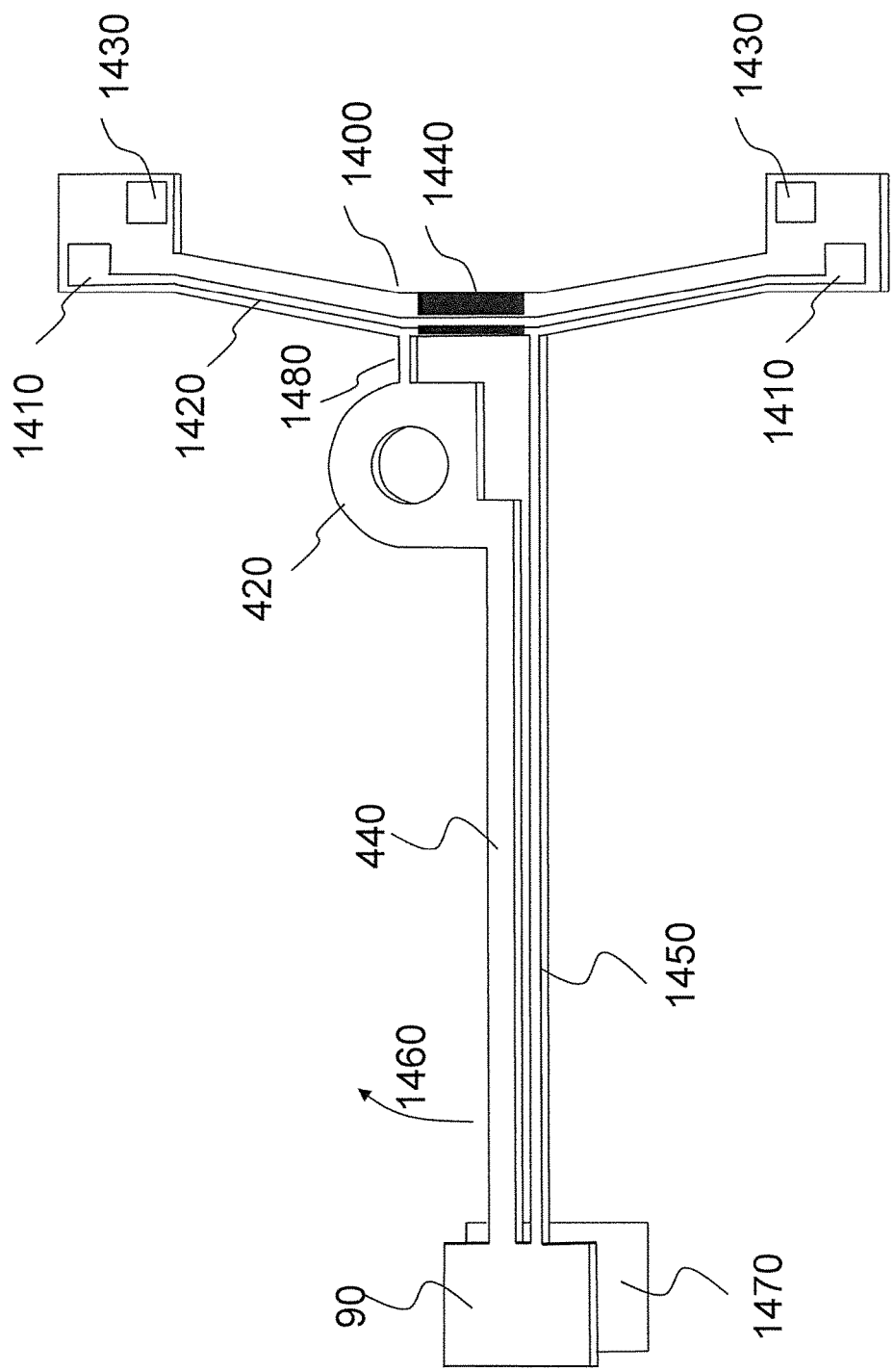
FIG. 14 shows an example of a three axes stage for the alignment of the microlens. A chevron with integrated heater pushes the lens along the optical axis, a dual arm thermal actuator moves the lens laterally, while a capactive pad below the arm moves the part up and down electro-statically.

An example of a part with built in actuators is shown in FIG. 14. In this case the lens holder 420 is connected to a chevron 1400. This chevron has an insulated metallization formed on the surface of the device that comprises a wire bonding pad 1410 on either end and a thin metal trace on the surface 1420. The lens holder, for example, may be coupled to or connected to the breadboard at both ends of the chevron to which the pads 1416 are provided. The thin metal trace can be formed out of nichrome or another material that is relatively resistive and can heat up with passing current. Since this metallization is insulated from the p+ silicon, it is only thermally connected to the chevron. As current passes and the chevron heats up, the silicon expands slightly. This thermal expansion is magnified by the geometry of the chevron to move the lens holder to the left of the figure.

Since the chevron is made of p+ material, it is also electrically conducting and has two additional pads 1430 on each end. These pads are alloyed into the silicon and passing current between them causes current to flow in the silicon part itself. The actuator has a central section in the chevron 1440 that has an n-type implant and forms a barrier to the current passing straight through from one pad to the next. Thus the electric current passes from the top pad through the lens holder 420, through the thick lever arm 440 and then return through the thin lever arm 1450 and down the chevron to the lower bond pad. Since the thin lever arm has a higher electrical resistance, the thin lever arm warms up and expands slightly compared to the thick lever arm. This causes the two arms to bend upwards in the figure in the direction shown in the arrow 1460.

The third actuator that moves the lens down towards the optical breadboard (into the page on FIG. 11) is electrostatic. By applying a negative voltage to a pad placed below the actuator 1470, the part is electrostatically deflected downwards and adjusts the lens in the other dimension. The embodiment of we have shown a large "handle" 90 at the end of the actuator that would provide a large area to generate a strong downward force.

In the example of FIG. 14, each actuator moves in one axis, but only in one direction. In such cases, as is well known in the art, the dimensions of the breadboard are such that nominal alignment is obtained half way through the range of motion. That way, by reducing or increasing the current to the actuators, errors in both directions can be compensated. In the case where actuators can reverse direction, biasing the part midway through the range would not be necessary.

Once the position of the lens has been optimized by using the three actuators described above, the part can be soldered or otherwise fixed into position in the same manner as described previously. Once the part is soldered down, the electrical drive to the actuators is removed and the part stays in place. There will be some residual stress as the actuators pull back, but the solder should hold the part firmly in place. Alternatively, one may desire to break off the actuator from the lens holder to eliminate any chance of deformation and creep in the solder. In FIG. 14, the narrow connection to the lens holder 1480 is a place that may be utilized for disconnection. Alternatively, the lens holder could be pushed against the actuator with a counter force spring. Electrical actuation would push the lens holder away and compress the counter force spring. Once the part is locked down, the actuator would retract, but the lens holder would stay in place.

Figure 15:
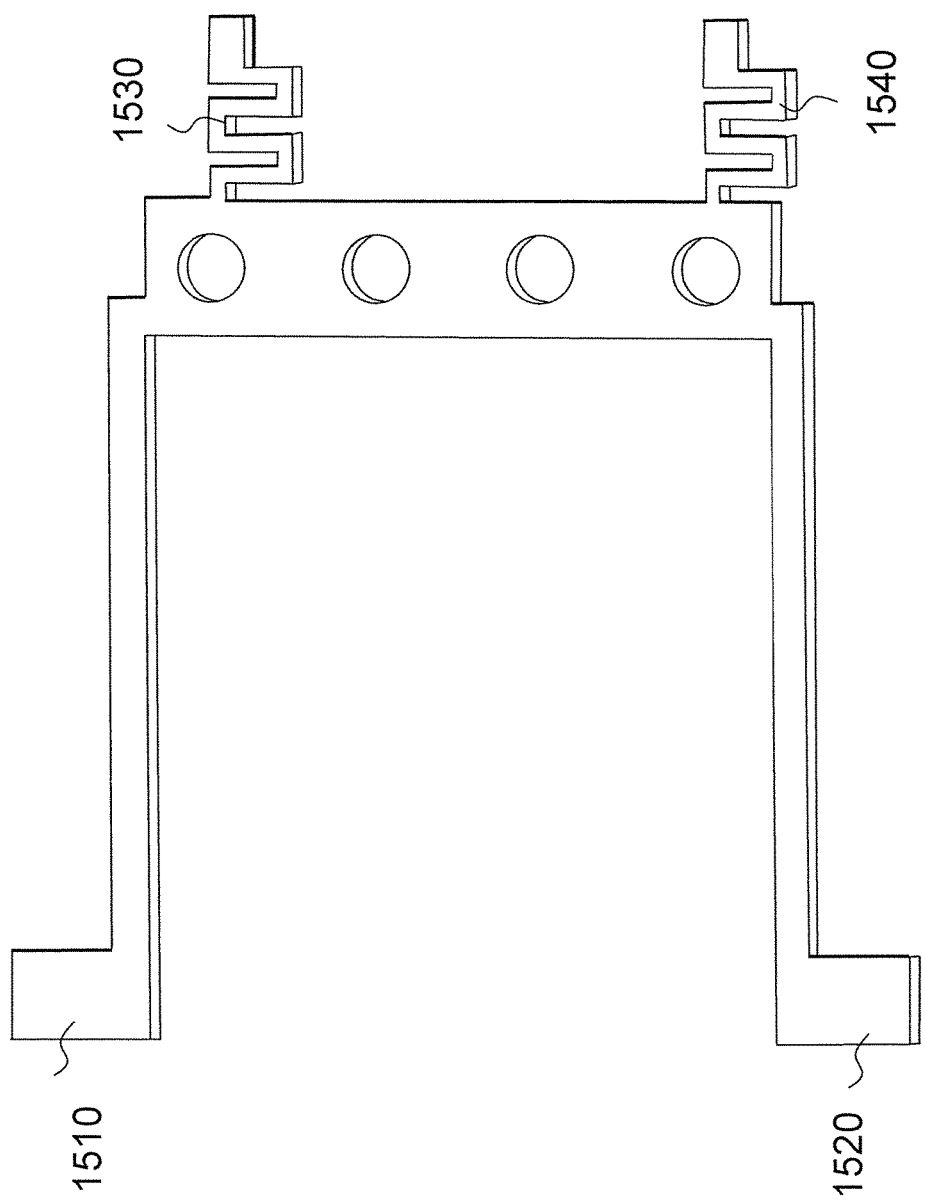
FIG. 15 shows a lens holder for use with either an array of 4 microlenses or 4 individual lenses.

When the number of channels becomes larger, integrated arrays can be simpler than using individual components. For example, a single laser chip can contain a number of laser elements, each of which is designed to operate at a different wavelength. Similarly, a microlens array can be fabricated with precise spacing between the elements. Thus all three elements, the laser array, the microlens array, and the PLC input waveguide array are all matched. In this case the entire microlens array can be aligned in one step. FIG. 15 shows a single lens holder intended for connection to the breadboard about free ends of springs in some embodiments, with positions for separate lenses. Alternatively, a lithographically defined lens array could be mounted on the part. Rather than 4 separate handles and four springs, there are only two handles 1510, 1520 and two springs 1530, 1540 since the spacing between the lenses do not require adjustment. In this case by pushing both handles in one direction or the other the entire assembly moves together. However, one can also tilt the structure by pushing the handles in different directions.

Figures 16A, 16B:
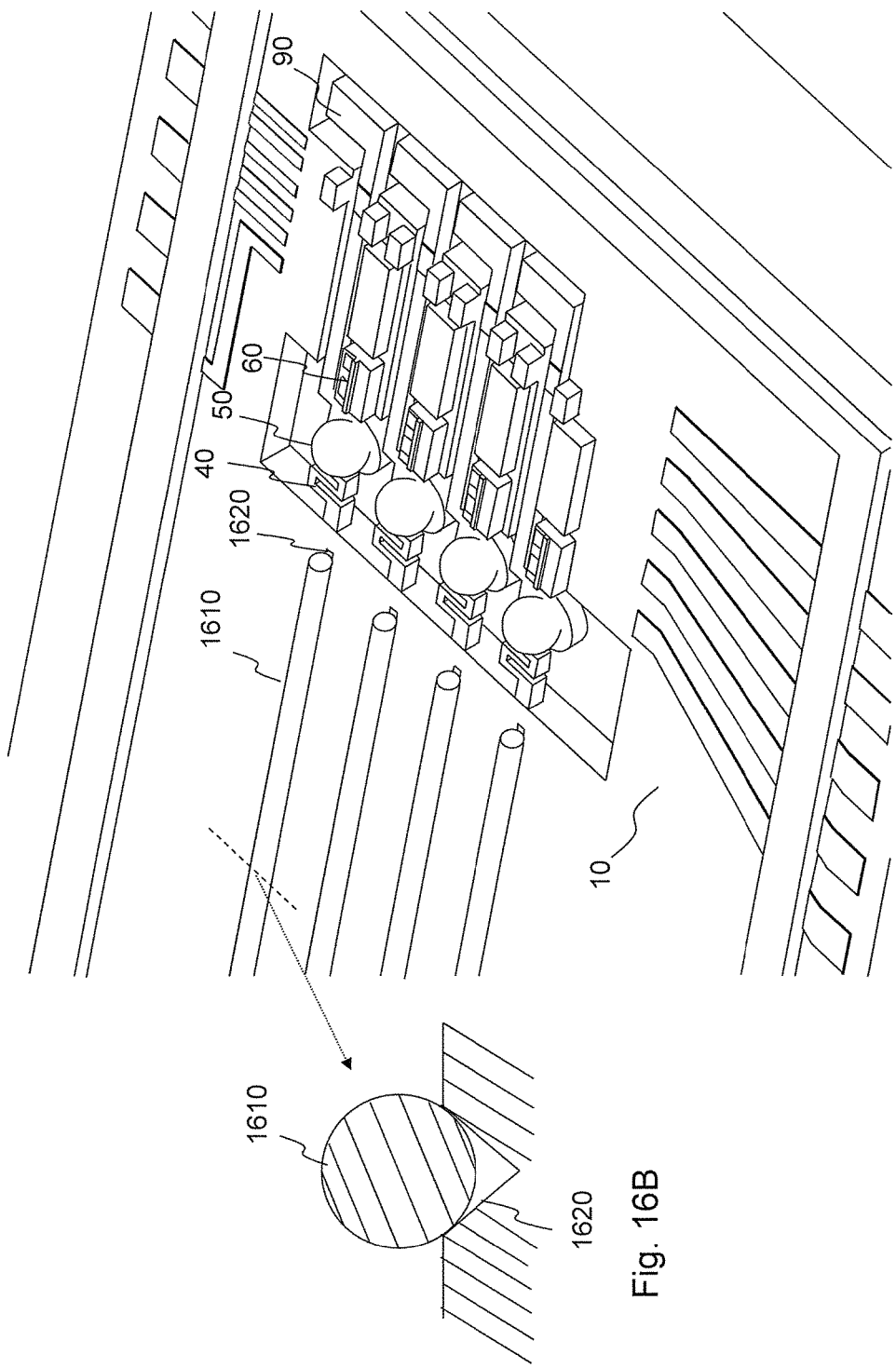
FIGS. 16A and 16B illustrate on embodiment of the invention where instead of a PLC with four integrated waveguides, four fibers are used, and a cross-section of a fiber and groove holding the fiber.

There are also applications where the PLC is not needed, or is already fiber coupled outside of the package. In these instances the beam is coupled into multiple fibers directly. In some embodiments four fibers are used that compose a ribbon instead of a PLC. FIG. 16 shows this embodiment. The PLC has been replaced by four fibers 1610. One advantage of a silicon breadboard is that v-grooves or other alignment structures can be fabricated in the breadboard to guide the fibers to the correct position. In this case there is a shallow v-groove etched in the silicon breadboard. 1620. The enlargement to the side of the figure shows how the anisotropically etched v-groove holds the fiber. Such v-groove mechanisms are well known in the art. If desired an isolator can be placed before the fiber, and other configurations, such as a dual lenses in each optical path to collimate and then refocus the beam are possible.

Figure 17:
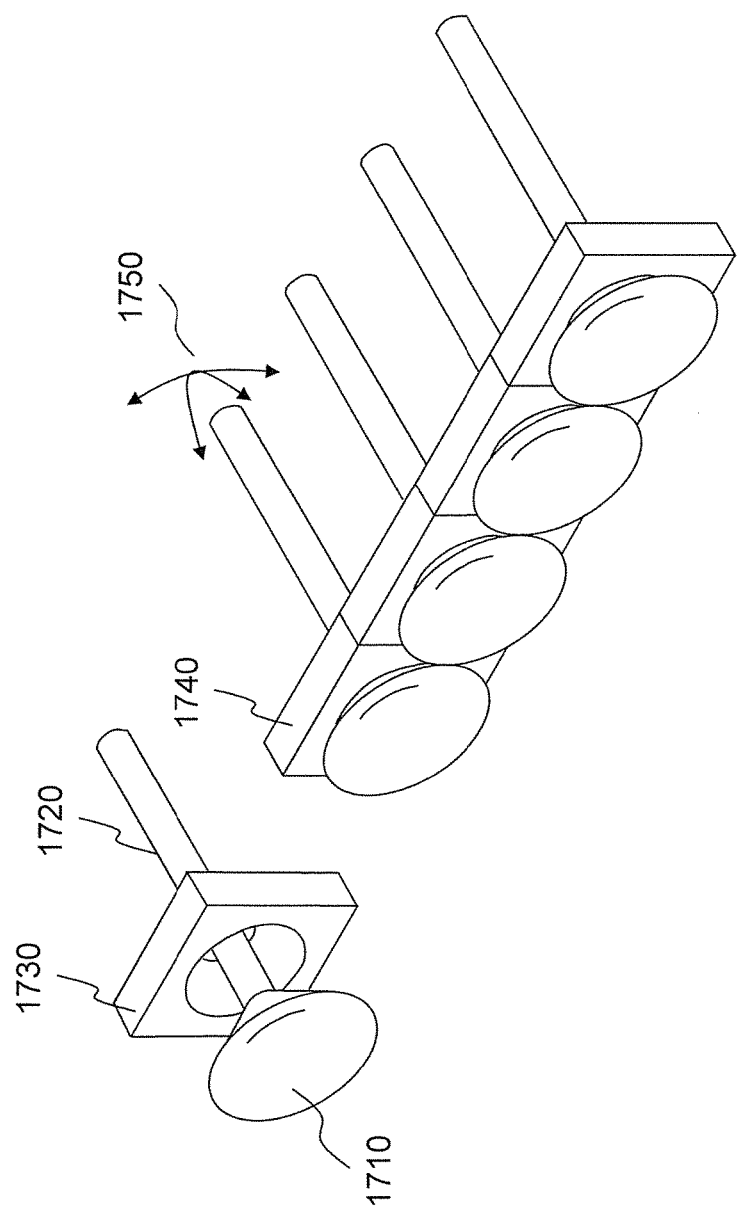
FIG. 17 illustrated a single exploded view of a spherical mirror connected to an alignment rod, and an array of 4 such devices assembled.

The discussion so far has centered on the use of a moveable microlens or ball lens to optimized the alignment. However, a curved mirror may be used instead. The curved mirror can be moved electrostatically, like a standard micromirror, or be rotated manually with demagnification to steer the focused beam and optimize the alignment. The curved mirror can be stamped out at the end of a pin, as shown in FIG. 17. Each mirror surface 1710 is curved as to reflect and focus the beam. The mirror is mounted on a rod 1720 that can be manipulated, for example from an end distal from the mirror. The pin, including the mirror is mounted in a holder 1730, such that it can be rotated to change the angle. An array of such mirrors can easily be fabricated 1740, and the angle of each pin individually adjusted by moving the end of the lever 1750. Note that by having a long rod 1720 at the back of each pin, the same demagnification effect that was realized in the earlier geometry is once again obtained. Similar methods of fixing the part in place after alignment can be used.

Figure 18A:
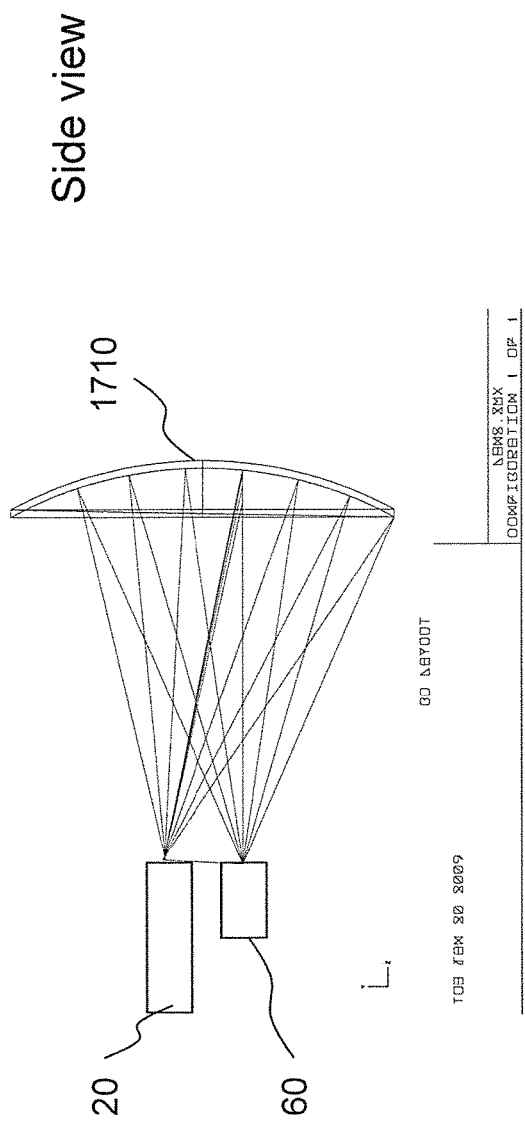
FIGS. 18A and 18B show a side view (FIG. 18A) and a top view (FIG. 18B) of curved mirrors used to refocus the diverging beam of a laser diode back into the input waveguides of a PLC.
Figure 18B:
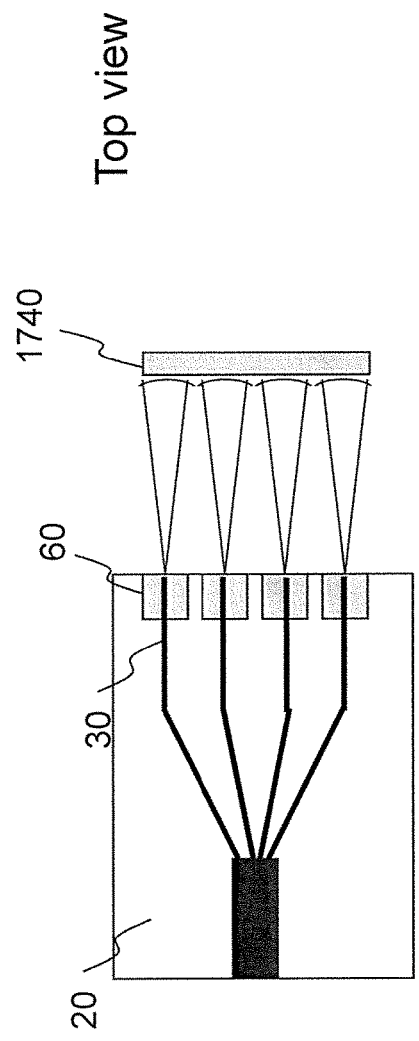

The optical design is shown in FIG. 18. The laser output simply reflects from the curved mirror and is refocused onto the input waveguide of the PLC. The laser(s) can be mounted on top of the PLC.

A combination of ball lenses and curved mirrors can also be used. This can yield to higher coupling efficiency and allow more room for placing components. For example, as shown schematically in FIG. 19, a surface mounted isolator 1910 could be placed between the ball lens and the spherical mirror. If it has a large enough aperture, it could accommodate all four beams. In this case the ball lens 50 collimates the beam from the laser diode, and the curved mirror 1510 refocuses the beam onto the PLC. If the PLC has an angled facet in the proper direction 1920, the coupling can be improved.

Figure 19:
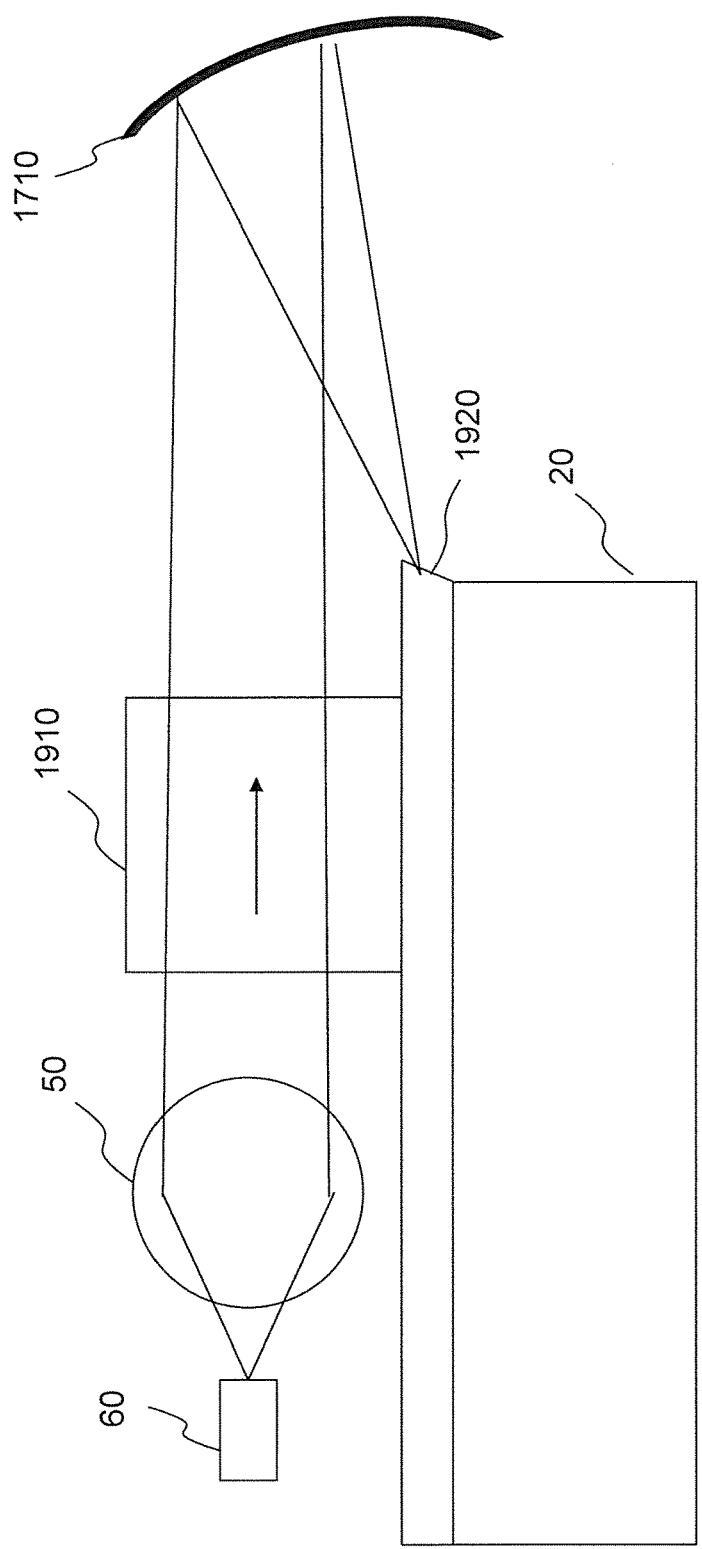
FIG. 19 shows how a combination of a ball lens and a curved mirror can be used to coupled the light from the laser into the PLC. In this case an isolator can be placed in between the two ends.
Figure 20:
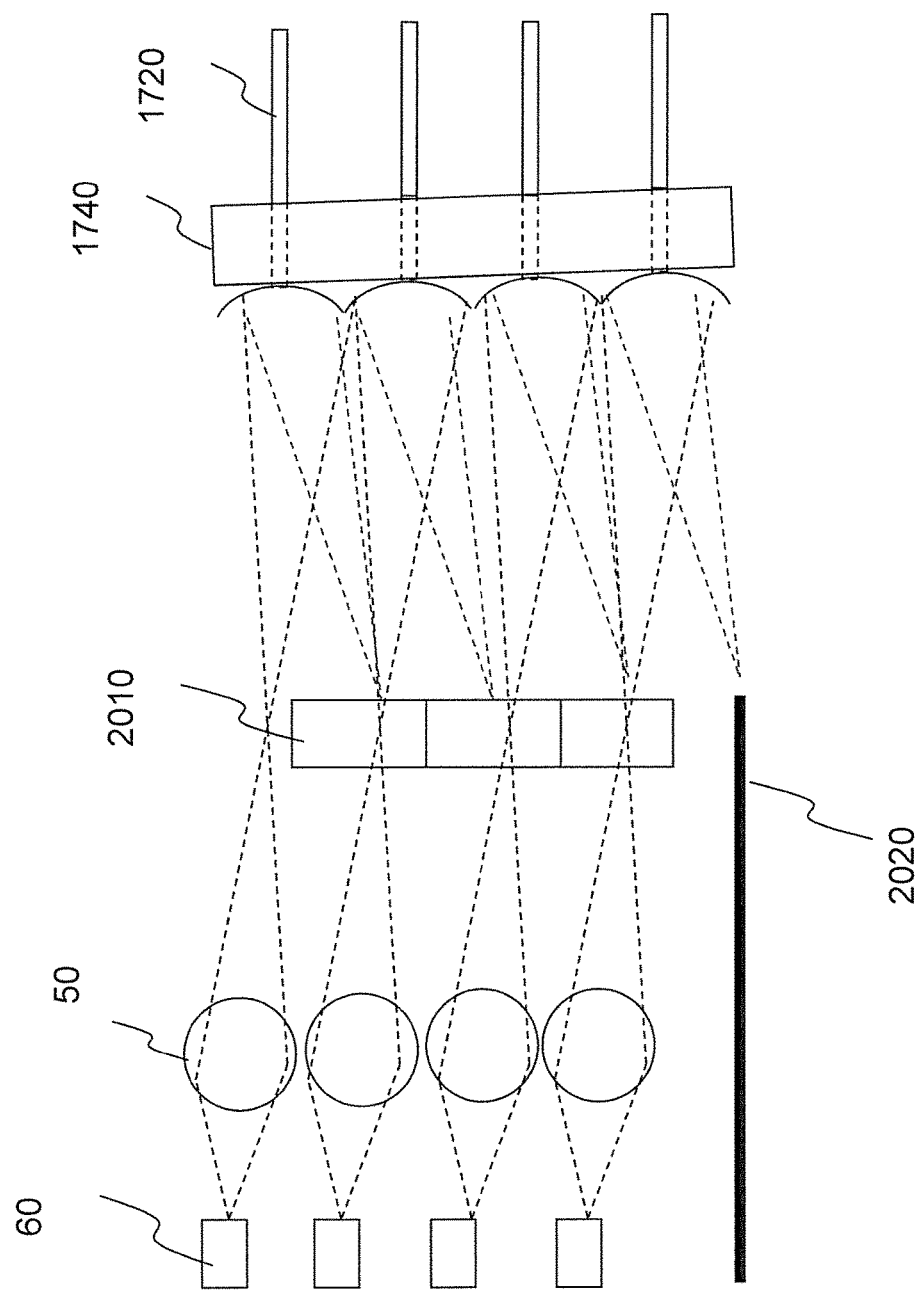
FIG. 20 shows an assembly of 4 lasers, four adjustable concave mirrors and a thin film filter combination to multiplex the beams into a single fiber.

The configuration of FIG. 19 expands the room available for other components. For example, one could use thin film filters that allow one wavelength to pass through while reflecting other wavelengths could be used in this configurations to multiplex all the wavelengths together. This obviates the need for a PLC, and one may couple directly to the output waveguide. This configuration is shown in FIG. 20. Four laser diodes 60 emit optical beams that are collimated by ball lenses 50. These four collimated beams then pass through three thin film filters 2010 that reflect other wavelengths except the one impinging directly from the laser. The beams are then reflected against the spherical mirrors and are ultimately focused into an optical fiber 2020. Once again, is that the entire package can be aligned by moving the levers connected to the concave mirrors.

Figure 21A:
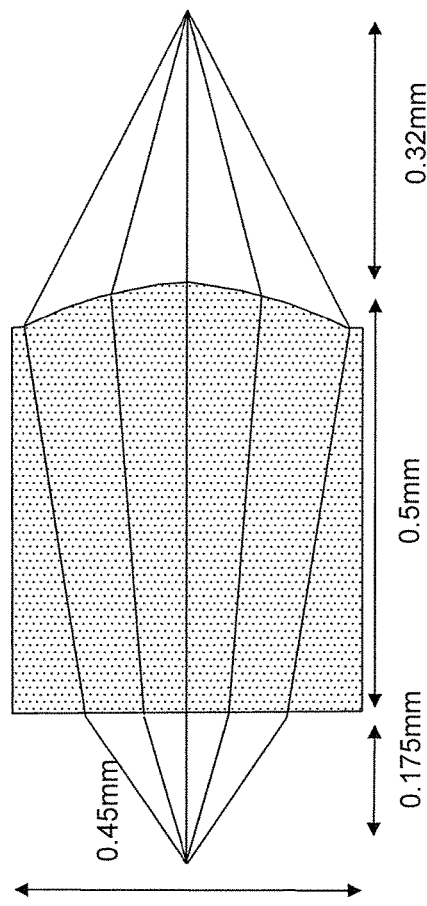
FIGS. 21A and 21B show the dimensions of an aspheric lens made in silicon that can provide high coupling efficiency for this application. In the inset, the coupling loss is shown as a function of the positioning error.
Figure 21B:
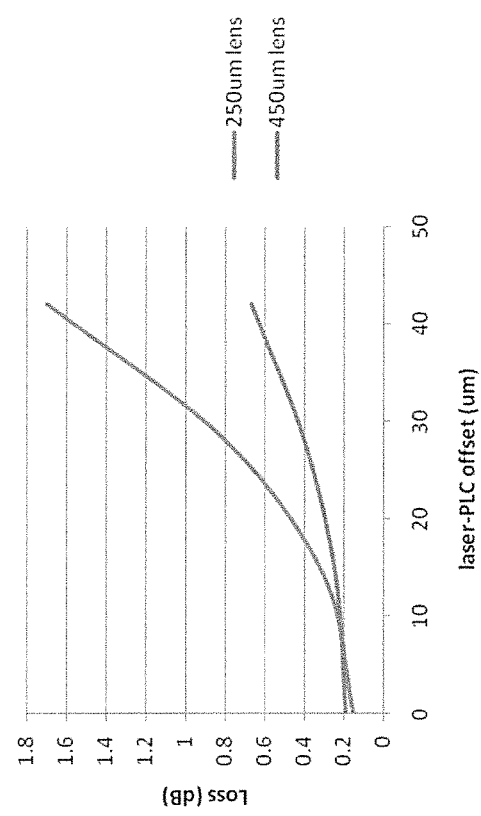

For the sake of simplicity the optics have generally been described as spherical, whether it be the lenses or the mirrors. Of course, as described earlier, an asphere can have lower aberration and will result in higher coupling efficiencies. A very convenient lens for this application is a plano-convex silicon lens that is fabricated lithographically on a wafer. These lenses are available commercially and generally formed by reflowing photoresist or polymer on silicon followed by a dry etch step that transfers the shape of the photoresist to the silicon. The lens is then antireflection coated on the front and the back and diced either into singlets or arrays. Sometimes these lenses are fabricated on silicon-on-insulator wafers, which are then released to form very small lenses. FIG. 21A shows such a lens and FIG. 21B show a chart of a calculation of the coupling using the lens from a laser to a PLC.

In some embodiments to optimize the power into an output waveguide for light from an input waveguide for devices as discussed herein, some light is first detected in the output waveguide. When the beam is well focused, the spot is quite small and it can be difficult to detect any coupled light in the output waveguide if x and y positions are not optimized, with x and y directions being orthogonal to each other and the z direction, which is generally along an optical axis of light. However, if for example a lens between the input waveguide and the output waveguide is far from an optimum position in the longitudinal (z) direction, the beam is very poorly focused and larger, and therefore at least some light is likely to be detected in the output waveguide. Thus, in some embodiments the lens is first moved almost to the maximum position along the optical axis, either all the way towards the output waveguide, or all the way towards the source waveguide. Then the coupled power in the output waveguide is measured and recorded as "A". The lens is then optimized in x, an axis perpendicular to the direction of light. The optimization can be performed by moving the lens in the positive x direction a small amount, measuring the light, and then moving in the negative direction a small amount and measuring the light. If at either point the coupled optical power is larger than at the center point, this new point becomes the center point and the process repeats. This cycle continues until one is sure that the center point has the maximum coupled power. The process is then repeated in exactly the same way in y, the other axis perpendicular to the propagation of light, and then in z, the longitudinal or propagation direction. Once all three axes are aligned, the coupled power is measured again and compared to the value originally recorded as A. If the power has increased, the entire process repeats. On the other hand, if alignment in x, y, and z does not result in further power increase, then one can be assured of maximum power, and the process then locks down the lens by epoxying or soldering the lever down to the substrate.

In some applications, one may not desire to have the maximum power coupled, since it may lead to modulation powers above the target specifications. Furthermore, the power can sometimes not be reduced by decreasing the laser current, since it can lead to a slower response from the laser. If this is the case, or even if this is not the case, after optimization, the lens can be moved in the z direction away from the optimum position to lower the output waveguide coupled power gradually from the maximum amount until the power reaches the desired value.

Figure 22:
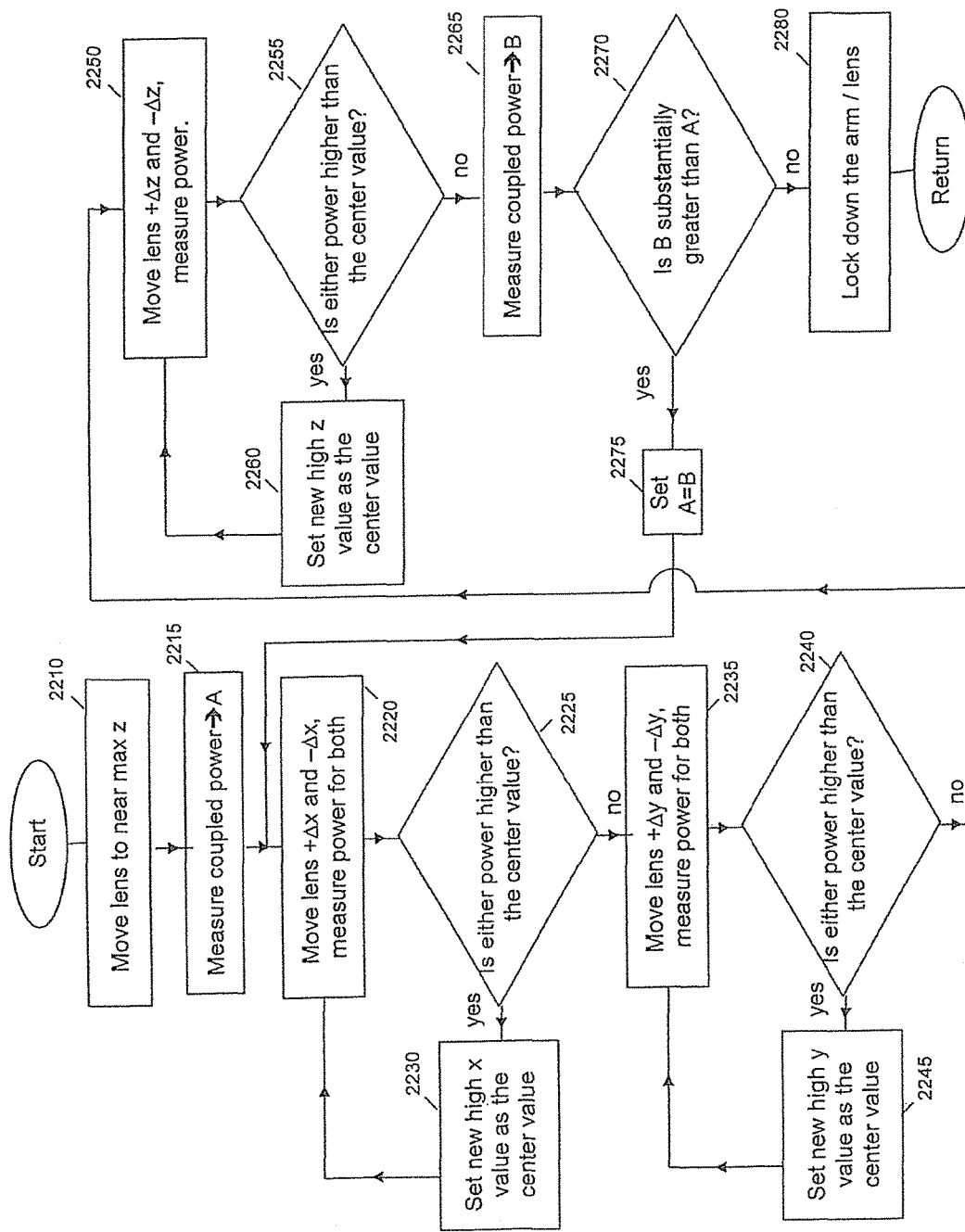
FIG. 22 is a flow chart of a process for aligning an optical device in accordance with aspects of the invention.

FIG. 22 is a flow chart of an example of a control loop that can be used to optimize the power coupled from the source waveguide to the output. The process of FIG. 22 may be performed using a controller or circuitry electronically coupled to circuitry for determining optical power and to actuators of an optical device, for example as described herein.

In block 221 the process moves the lens to a position along the optical axis, which may be considered the z-axis, closest to an output waveguide, although in some embodiments the process moves the lens to a position along the optical axis farthest from the output waveguide, with the process considering the resulting position in the x, y, and z axis the x, y, and z center points. In block 2215 the process determines an initial indication of optical power coupled to the output waveguide.

In block 2220 the process moves the lens to a position a small distance in a first direction perpendicular to the optical axis, with the first direction being considered the x-axis, and to a corresponding position in the opposite direction, and determines an indication of optical power coupled to the output waveguide for both positions. In some embodiments a small distance along the x-axis may be on the order of 0.1 microns, in some embodiments about 0.1 microns, and in some embodiments 0.1 microns. In block 2225 the process determines if either measured power is greater than the initial indication of optical power coupled to the output waveguide. If so, the process in block 2230 sets the position with the greatest power as the x center point, and the process returns to block 2220. Otherwise, the process continues to block 2235.

In block 2235 the process moves the lens to a position a small distance in a second direction perpendicular to the optical axis and the x-axis, with the second direction being considered along the y-axis, and to a corresponding position in the opposite direction, and determines an indication of optical power coupled to the output waveguide for both positions. In some embodiments a small distance along the y-axis is as discussed with respect to the x-axis. In block 2240 the process determines if either measured power is greater than the initial indication of optical power coupled to the output waveguide. If so, the process in block 2245 sets the position with the greatest power as the y center point, and the process returns to block 2235. Otherwise, the process continues to block 2250.

In block 2250 the process moves the lens to a position a small distance in the z-direction, and, if possible, to a corresponding position in the opposite direction, and determines an indication of optical power coupled to the output waveguide for both positions. In some embodiments a small distance along the z-axis is five times the small distance discussed with respect to the x-axis. In block 2255 the process determines if either measured power is greater than the initial indication of optical power coupled to the output waveguide. If so, the process in block 2260 sets the position with the greatest power as the z center point, and the process returns to block 2250. Otherwise, the process continues to block 2270.

In block 2265 the process determines an indication of optical power coupled to the output waveguide, although it should be realized that measured power from block 2250 may be used. In block 2270 the process determines if the optical power determined in block 2270 is greater, in some embodiments, and substantially greater, in other embodiments, than the optical power determined in block 2215. If so, the process sets the initial indication of optical power coupled to the output waveguide to the optical power determined in block 2265, and the process returns to block 2220. Otherwise the process locks position of the lens, by locking position of an arm or lever holding the lens in most embodiments, and thereafter returns.

Aspects of the invention therefore include a platform where micromechanically adjustable optical components are used to align from one or multiple lasers or laser arrays into a planar lightwave circuit or other output waveguides. Although the invention has been described with respect to various embodiments, it should be recognized that the invention includes the novel and non-obvious claims supported by this disclosure.

The invention claimed is:

1. A micromechanically aligned optical assembly, comprising:
   a first waveguide on a substrate;
   a second waveguide on the substrate;
   a lens for focusing light of the first waveguide into the second waveguide;
   a lever holding the lens, the lever including a holder for holding the lens and a flexure, the lever having a first end fixed to the substrate, the flexure being between the first end of the lever and the holder, a second end that is further from the first end than the holder, the holder holding the lens at a position such that movement of the lever will result in demagnified movement of the lens, as compared to movement of the second end of the lever, in at least directions other than an optical axis of light of the first waveguide, the lever moveable so as to position the lens to focus light of the first waveguide into the second waveguide; and
   wherein the flexure has a high resonance frequency greater than 800 Hz.

2. The micromechanically aligned optical assembly of claim 1, wherein the lever is integral to the substrate.

3. The micromechanically aligned assembly of claim 2 wherein the flexure is comprised of silicon.

4. The micromechanically aligned assembly of claim 3 wherein the flexure has a first end proximate to the first end of the lever, a second end proximate to the holder and a zigzag shape between the first and second ends.

5. The micromechanically aligned assembly of claim 1 further comprising a second flexure between the second end of the lever and the holder to allow movement of the lens along the optical axis, the movement of the lens along the optical axis being demagnified as compared to movement of the second end of the lever.

6. The micromechanically aligned assembly of claim 1 further comprising at least one actuator coupled to the lever, the at least one actuator configured to cause movement of the holder of the lever in at least one direction absent application of the adhesive material effectively fixing the position of the arm and holder.

7. The micromechanically aligned assembly of claim 6 wherein each of the at least one actuators is one of a comb actuator, a thermal actuator, and an electrostatic actuator.

8. The micromechanically aligned assembly of claim 1 further comprising an adhesive for locking the lever in place.

9. The micromechanically aligned assembly of claim 1 further comprising an arm between the second end of the lever and the holder, the arm having a longitudinal length that is substantially parallel to the optical axis of light.

* * * * *